United States Patent
Konishi et al.

(10) Patent No.: US 11,590,413 B2
(45) Date of Patent: Feb. 28, 2023

(54) STORAGE MEDIUM STORING INFORMATION PROCESSING PROGRAM WITH CHANGEABLE OPERATION MODES, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Yoshinori Konishi, Kyoto (JP); Tadashi Matsushita, Kyoto (JP); Daiji Imai, Kyoto (JP); Yugo Hayashi, Kyoto (JP); Mariko Fukui, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 33 days.

(21) Appl. No.: 17/358,254

(22) Filed: Jun. 25, 2021

(65) Prior Publication Data
US 2022/0008820 A1     Jan. 13, 2022

(30) Foreign Application Priority Data

Jul. 8, 2020   (JP) .............................. JP2020-117675
Jul. 8, 2020   (JP) .............................. JP2020-117676

(51) Int. Cl.
*A63F 13/2145*   (2014.01)
*A63F 13/211*    (2014.01)
(Continued)

(52) U.S. Cl.
CPC ........ *A63F 13/2145* (2014.09); *A63F 13/211* (2014.09); *A63F 13/426* (2014.09);
(Continued)

(58) Field of Classification Search
CPC ... A63F 13/211; A63F 13/2145; A63F 13/426
See application file for complete search history.

(56) References Cited

U.S. PATENT DOCUMENTS 9,612,709 B2 *   4/2017   Shin .................... G06F 3/048
10,391,399 B2 *  8/2019   Soejima ............ A63F 13/2145
(Continued)

FOREIGN PATENT DOCUMENTS

JP      2016-9473       1/2016
JP      2019-083964     6/2019
(Continued)

OTHER PUBLICATIONS

Konishi et al., U.S. Appl. No. 17/358,252, filed Jun. 25, 2021, 86 pages.
(Continued)

*Primary Examiner* — Chase E Leichliter
(74) *Attorney, Agent, or Firm* — Nixon & Vanderhye PC

(57) ABSTRACT

In a first mode, a direction of a first control is determined based on a component in a first axial direction of a difference between a first reference coordinate point and a coordinate point of a coordinate input, and a direction of a second control is determined based on a component in a second axial direction. In a second mode, the direction of the first control is determined based on a component in a third axial direction of a difference between a first region reference coordinate point and a coordinate point of the coordinate input performed in a first region, and the direction of the second control is determined based on a component in a fourth axial direction of a difference between a second region reference coordinate point and a coordinate point of the coordinate input performed in a second region.

20 Claims, 17 Drawing Sheets

(51) Int. Cl.
*A63F 13/426* (2014.01)
*A63F 13/573* (2014.01)
*A63F 13/803* (2014.01)
*A63F 13/92* (2014.01)

(52) U.S. Cl.
CPC .......... *A63F 13/573* (2014.09); *A63F 13/803* (2014.09); *A63F 13/92* (2014.09)

(56) References Cited

U.S. PATENT DOCUMENTS

| | | | | |
|---|---|---|---|---|
| 11,266,904 B2* | 3/2022 | Nakamura | .......... | A63F 13/2145 |
| 2011/0077083 A1* | 3/2011 | Ahn | .......... | A63F 13/2145 345/173 |
| 2012/0154311 A1* | 6/2012 | Iijima | .......... | A63F 13/426 345/173 |
| 2013/0024806 A1* | 1/2013 | Funabashi | .......... | A63F 13/533 715/781 |
| 2013/0316817 A1* | 11/2013 | Tanzawa | .......... | G06F 3/0481 463/31 |
| 2014/0011584 A1* | 1/2014 | Shin | .......... | A63F 13/2145 463/31 |
| 2014/0066195 A1* | 3/2014 | Matsui | .......... | A63F 13/06 463/30 |
| 2014/0364214 A1* | 12/2014 | Ayoub | .......... | A63F 13/2145 463/31 |
| 2015/0378459 A1* | 12/2015 | Sawada | .......... | G06F 3/0488 345/173 |
| 2016/0107081 A1* | 4/2016 | Hirai | .......... | A63F 13/95 463/31 |
| 2018/0050265 A1* | 2/2018 | Wada | .......... | A63F 13/56 |
| 2019/0070493 A1* | 3/2019 | He | .......... | G06F 3/04815 |
| 2019/0118078 A1* | 4/2019 | Li | .......... | G06F 3/04883 |
| 2019/0262700 A1* | 8/2019 | Nakamura | .......... | A63F 13/525 |
| 2019/0262709 A1* | 8/2019 | Nakamura | .......... | A63F 13/537 |
| 2019/0265882 A1* | 8/2019 | Nakahara | .......... | G06F 3/04845 |
| 2019/0299091 A1* | 10/2019 | Wu | .......... | A63F 13/5255 |
| 2020/0038746 A1* | 2/2020 | Nakamura | .......... | A63F 13/2145 |
| 2020/0376375 A1* | 12/2020 | Chen | .......... | A63F 13/211 |
| 2020/0387280 A1* | 12/2020 | Mochizuki | .......... | G06F 3/0488 |
| 2021/0008445 A1* | 1/2021 | Hayashi | .......... | G06F 3/011 |
| 2021/0016172 A1* | 1/2021 | Huang | .......... | A63F 13/56 |
| 2021/0052984 A1* | 2/2021 | Kurabayashi | .......... | A63F 13/92 |
| 2021/0101074 A1 | 4/2021 | Hemby et al. | | |
| 2021/0316210 A1* | 10/2021 | Miyano | .......... | A63F 13/2145 |
| 2021/0394064 A1* | 12/2021 | Kanamori | .......... | A63F 13/45 |
| 2022/0008819 A1 | 1/2022 | Konishi | | |

FOREIGN PATENT DOCUMENTS

| | | |
|---|---|---|
| JP | 2019-166218 | 10/2019 |
| JP | 2019-187801 | 10/2019 |
| WO | 2015-139502 | 8/2015 |
| WO | 2019/052340 | 3/2019 |
| WO | 2019/211950 | 11/2019 |

OTHER PUBLICATIONS

Graham McAllister, "A Guide To iOS Twin Stick Shooter Usability", May 30, 2011, XP055193952, Retrieved from the Internet on Jun. 5, 2015, pp. 1-15. http://www.gamasutra.com/view/feature/134693/a_guide_to_ios_twin_stick_shooter_.php?print=1.

* cited by examiner

STORAGE MEDIUM STORING INFORMATION PROCESSING PROGRAM WITH CHANGEABLE OPERATION MODES, INFORMATION PROCESSING APPARATUS, INFORMATION PROCESSING SYSTEM, AND INFORMATION PROCESSING METHOD

CROSS REFERENCE TO RELATED APPLICATIONS

This application claims priority to Japanese Patent Application Nos. 2020-117675 and 2020-117676, filed on Jul. 8, 2020, the entire contents of which are incorporated herein by reference.

FIELD

The technology disclosed herein relates to storage media storing information processing programs, information processing apparatuses, information processing systems, and information processing methods, and more specifically, to, for example, a storage medium storing an information processing program, information processing apparatus, information processing system, and information processing method that execute a process based on a touch operation.

BACKGROUND AND SUMMARY

There are conventionally handheld terminals that perform information processing based on a touch operation. In some such handheld terminals, when the handheld terminal is in portrait position, the handheld terminal is in a mode in which the handheld terminal is automatically controlled, and when the handheld terminal is in landscape position, a character is moved by an operation performed by the user's left hand, and a viewing direction is changed by an operation performed by the user's right hand.

However, the handheld terminal described above needs to be operated by totally different methods for a process in the automatic operation mode, a process by an operation using the user's left hand, and a process by an operation using the user's right hand, and it takes time to get used to each operation.

With this in mind, it is an object of this non-limiting example to provide a storage medium storing an information processing program, information processing apparatus, information processing system, and information processing method that can enable the user to easily learn operations that are performed in different operation modes in which different operating methods are used.

To achieve the above, this non-limiting example has the following features, for example.

A non-limiting example configuration of an information processing program of this non-limiting example is carried out by a computer of an information processing apparatus that controls a game using a coordinate input detected by a touch input device having a touch region. The information processing program causes a computer to at least: change an upward/downward direction of an image displayed on the touchscreen between a first and a second display direction that is different from the first display direction by 90 degrees, depending on an orientation of the touchscreen with respect to the direction of gravity; change an operation mode between a first mode in which the upward/downward direction of the image is the first display direction and a second mode in which the upward/downward direction of the image is the second display direction; set a reference coordinate point based on a coordinate point of the detected coordinate input; perform a first control on the game; perform a second control different from the first control on the game; and setting a first and a second region in the touch region, wherein the first and second regions do not overlap each other. In the first mode, a first reference coordinate point is set as the reference coordinate point based on the coordinate point of the detected coordinate input. In the second mode, a first region reference coordinate point is set as the reference coordinate point in the first region based on the coordinate input performed in the first region, and a second region reference coordinate point is set as the reference coordinate point in the second region based on the coordinate input performed in the second region. In the first mode, a direction of the first control to be performed on the game is determined based on a component in a first axial direction of a difference between the first reference coordinate point and a coordinate point of the coordinate input performed after the setting of the first reference coordinate point. In the first mode, a direction of the second control to be performed on the game is determined based on a component in a second axial direction of the difference between the first reference coordinate point and the coordinate point of the coordinate input performed after the setting of the first reference coordinate point, the second axial direction being different from the first axial direction. In the second mode, the direction of the first control is determined based on a component in a third axial direction of a difference between the first region reference coordinate point and a coordinate point of the coordinate input performed in the first region after the setting of the first region reference coordinate point. In the second mode, the direction of the second control is determined based on a component in a fourth axial direction of a difference between the second region reference coordinate point and a coordinate point of the coordinate input performed in the second region after the setting of the second region reference coordinate point, the fourth axial direction being different from the third axial direction.

With the above configuration, if an operation has been learned in one of the two operation modes, an operation can be easily performed in the other operation mode, and therefore, operations in different operation modes in which different operating methods are used can be easily learned.

The direction of the second control may not be determined by the component in the fourth axial direction of the difference between the first region reference coordinate point and the coordinate point of the coordinate input performed in the first region after the setting of the first region reference coordinate point.

With the above configuration, when a touch operation for the first control is being performed, the second control can be prevented from being undeliberately performed due to detection of the component in the fourth axial direction of the touch operation although the second control is not intended by the user. Thus, such an incorrect operation can be prevented.

The direction of the first control may not be determined by the component in the third axial direction of the difference between the second region reference coordinate point and the coordinate point of the coordinate input performed in the second region after the setting of the second region reference coordinate point.

With the above configuration, when a touch operation for the second control is being performed, the first control can be prevented from being undeliberately performed due to detection of the component in the third axial direction of the touch operation although the first control is not intended by the user. Thus, such an incorrect operation can be prevented.

In the first mode, the direction of the first control to be performed on the game may be determined based on a component in the first axial direction of a difference between the first reference coordinate point and the coordinate point of the coordinate input performed in the first region, continuously following the setting of the first reference coordinate point.

With the above configuration, an operation in a mode in which touch operations, such as a swipe operation, flick operation, drug operation, and slide operation, are used can be easily learned.

The information processing apparatus may include a touchscreen as the touch input device. The information processing program may cause the computer to change directions. An upward/downward direction of an image displayed on the touchscreen may be changed between a first and a second display direction, depending on an orientation of the touchscreen with respect to the direction of gravity.

With the above configuration, operations that are performed in modes that are changed, depending on the display direction, can be easily learned.

The operation mode may be changed to the first mode when the upward/downward direction of an image is the first display direction, and to the second mode when the upward/downward direction of the image is the second display direction.

With the above configuration, the operation modes can be automatically changed, depending on the display direction of an image.

The first display direction may be different from the second display direction by 90 degrees.

With the above configuration, the operation modes can be changed, depending on the display directions of an image that are different from each other by 90°.

The information processing apparatus may include a touchscreen as the touch input device. The information processing program may further cause the computer to dispose a first image for giving an instruction to perform control related to the first control, in the first region on the touchscreen, in the second mode compared to the first mode.

With the above configuration, the first image for giving an instruction to perform control related to the first control can be displayed at a suitable position for an operation region that is used.

The information processing apparatus may include a touchscreen as the touch input device. The information processing program may further cause the computer to dispose a second image for giving an instruction to perform control related to the second control, in the second region on the touchscreen, in the second mode compared to the first mode.

With the above configuration, the second image for giving an instruction to perform control related to the second control can be displayed at a suitable position for an operation region that is used.

Even when the first control based on the coordinate input performed in the first region after the setting of the first region reference coordinate point is being performed, the second control may be performed based on the coordinate input in the second region.

With the above configuration, the first control and the second control can be performed simultaneously or in parallel.

The touch input device may have a rectangular touch region having a first and a second side, the first side being longer than the second side.

With the above configuration, operations in a plurality of modes in which a rectangular touch region is used can be easily learned.

The reference coordinate point may be moved to approach the coordinate point of the coordinate input according to a distance between the coordinate point of the coordinate input and the reference coordinate point.

With the above configuration, the reference coordinate point follows the coordinate input. Therefore, a most recent operation direction intended by the user can be used in control.

The first control may move a character object disposed in the virtual space.

With the above configuration, an operation of moving a character object can be easily learned.

The second control may move another object from a character object disposed in the virtual space.

With the above configuration, an operation of moving another object from a character object can be easily learned.

This non-limiting example may be carried out in the form of an information processing apparatus, information processing system, and information processing method.

According to this non-limiting example, operations in different modes in which different operating methods are used can be easily learned.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

Figure 1:
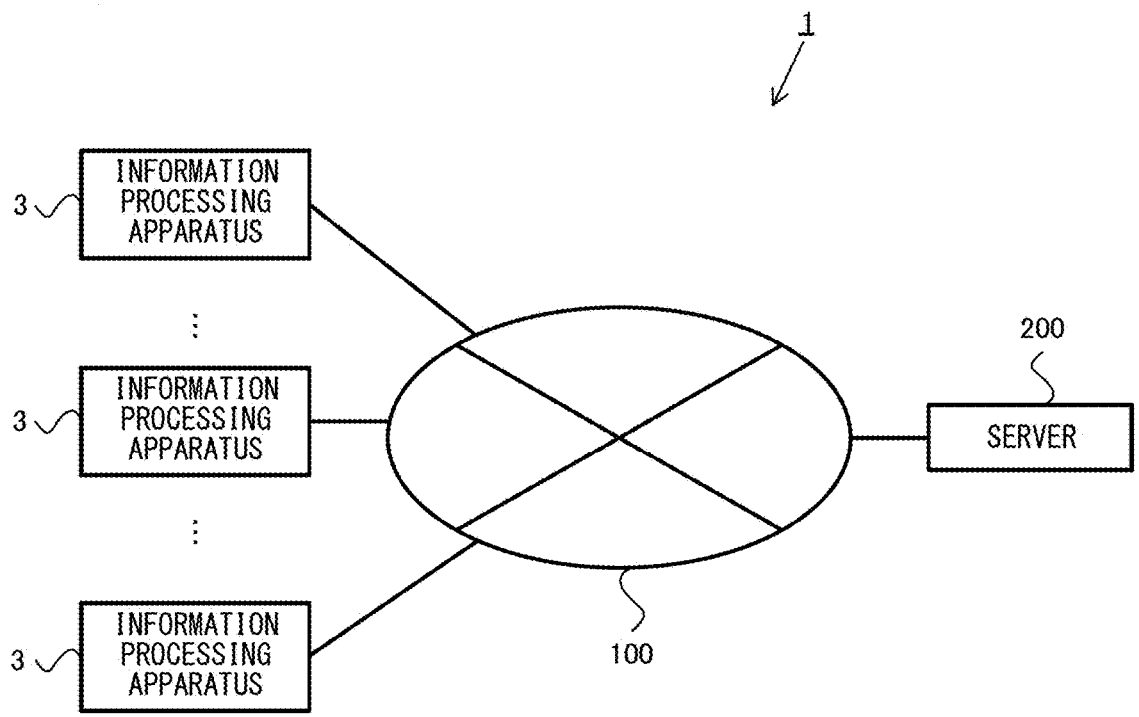
FIG. 1 is a diagram showing a non-limiting example of an information processing system 1 according to this non-limiting example.

An information processing system according to this non-limiting example will be described with reference to FIG. 1. As shown in FIG. 1, an information processing system 1 that is a non-limiting example of the information processing system of the non-limiting example, includes information processing apparatuses 3 and a server 200, which are connected together through a network 100. Although FIG. 1 shows a plurality of information processing apparatuses 3, the information processing system 1 may include only a single information processing apparatus 3.

The information processing apparatuses 3 are configured to be able to connect to the network 100 through wireless or wired communication. The information processing apparatuses 3 and the server 200 constitute a client-server system. For example, the information processing apparatuses 3 can execute a predetermined application (e.g., a game application, etc.). The information processing apparatuses 3 can connect to and communicate with the server 200 through the network 100 by executing the above predetermined application. For example, the information processing apparatuses 3 can execute an information processing program that is stored in a replaceable storage medium, such as a memory card or an optical disc, or is received from another apparatus. The information processing apparatuses 3 may be a typical personal computer, stationary game machine, mobile telephone, handheld game console, personal digital assistant (PDA), etc.

Figure 2:
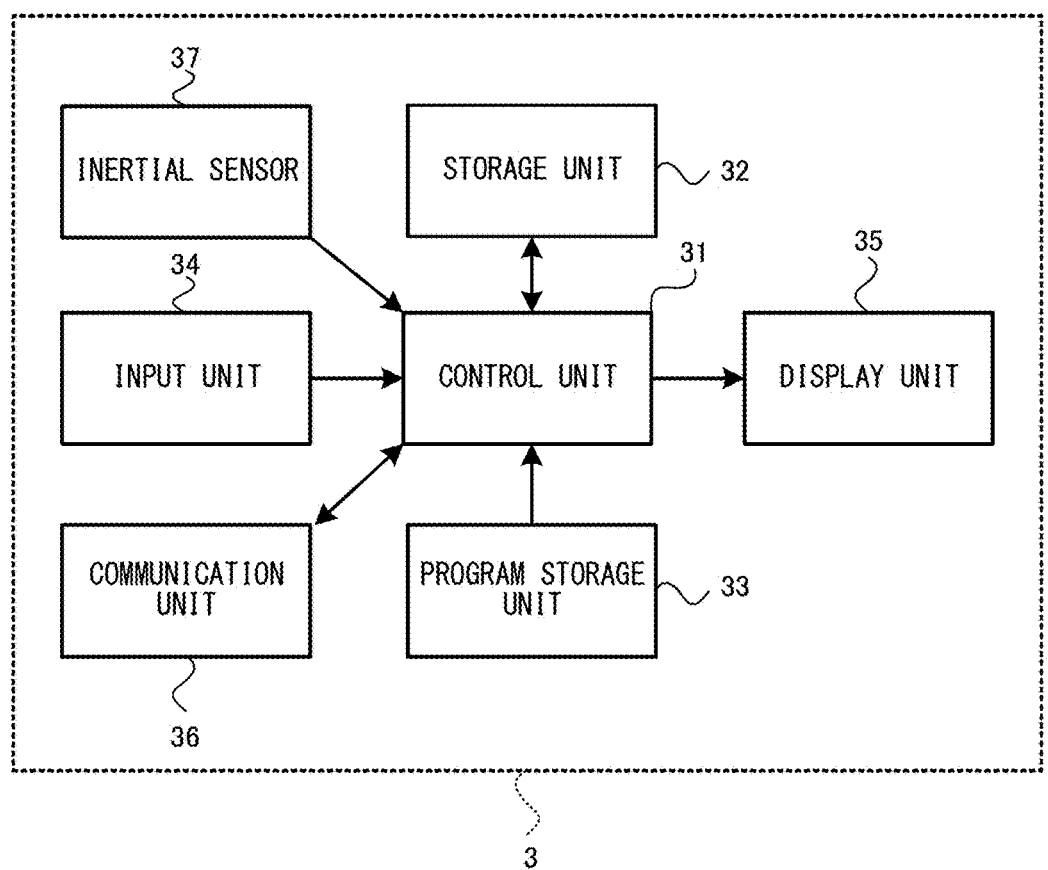
FIG. 2 is a block diagram showing a non-limiting example configuration of an information processing apparatus 3.

Next, the information processing apparatus 3 will be described with reference to FIG. 2. FIG. 2 is a block diagram showing a non-limiting example configuration of the information processing apparatus 3. In FIG. 2, the information processing apparatus 3 includes a control unit 31, a storage unit 32, a program storage unit 33, an input unit 34, a display unit 35, a communication unit 36, and an inertial sensor 37. It should be noted that the information processing apparatus 3 may include one or more devices including an information processing device including at least the control unit 31, and other devices.

The control unit 31 is an information processing means (computer) for executing various information processes, such as a CPU. For example, the control unit 31 has a function of executing the above application to perform information processes such as a game process described below, and data transmission and reception processes through the server 200. This function is performed by the control unit 31 (e.g., a CPU) executing predetermined programs.

The storage unit 32 stores various items of data that are used when the control unit 31 executes the above information processes. The storage unit 32 is, for example, a memory that can be accessed by the control unit 31 (e.g., a CPU).

The program storage unit 33 stores programs. The program storage unit 33 may be any storage device (storage medium) that can be accessed by the control unit 31. For example, the program storage unit 33 may be a storage device that is provided in the information processing device including the control unit 31, or a storage medium that is removably attached to the information processing device including the control unit 31. The program storage unit 33 may be a storage device (e.g., a server, etc.) that is connected to the control unit 31 through a network. The control unit 31 (CPU) may read all or a portion of a game program into the storage unit 32 and execute the read program with appropriate timing.

The input unit 34 is an input device that can be operated by a user. The input unit 34 may be any suitable input device. As a non-limiting example, the input unit 34 may be a touch panel provided on a screen of the display unit 35. For example, the touch panel may be of any type. The touch panel may be either of a type that allows a multi-touch input (e.g., a capacitive type) or of a type that allows a single-touch input (e.g., a resistive type). It should be noted that the input unit 34 corresponds to a non-limiting example of a touchscreen.

The display unit 35 displays an image according to an instruction from the control unit 31. It should be noted that when the information processing apparatus 3 is a stationary game apparatus or a personal computer, the display unit 35 may be separated from the information processing apparatus 3. In this non-limiting example, the display unit 35 includes a touchscreen provided with a touch panel (the input unit 34) at a surface thereof, and a rectangular display region and touch region that have a first side and a second side, the first side being longer than the second side.

The communication unit 36, which is a predetermined communication module, exchanges data with another apparatus (e.g., the server 200) or another information processing apparatus 3 through the network 100.

The inertial sensor 37 includes, for example, an acceleration sensor and/or an angular velocity sensor. For example, the acceleration sensor detects the magnitudes of accelerations along three orthogonal axial directions of the information processing apparatus 3 (the display unit 35). It should be noted that the acceleration sensor may detect an acceleration along one or two axial directions. The angular velocity sensor detects angular velocities about the three axes. It should be noted that the angular velocity sensor may detect an angular velocity about one or two axes. The inertial sensor 37 is connected to the control unit 31. A detection result of the acceleration sensor and/or angular velocity sensor is output to the control unit 31. Based on the detection result of the inertial sensor 37, the control unit 31 can calculate information about a motion and/or orientation of the information processing apparatus 3 (the display unit 35), e.g., an orientation of the information processing apparatus 3 (the display unit 35) in real space with respect to the direction of gravity.

Figure 3:
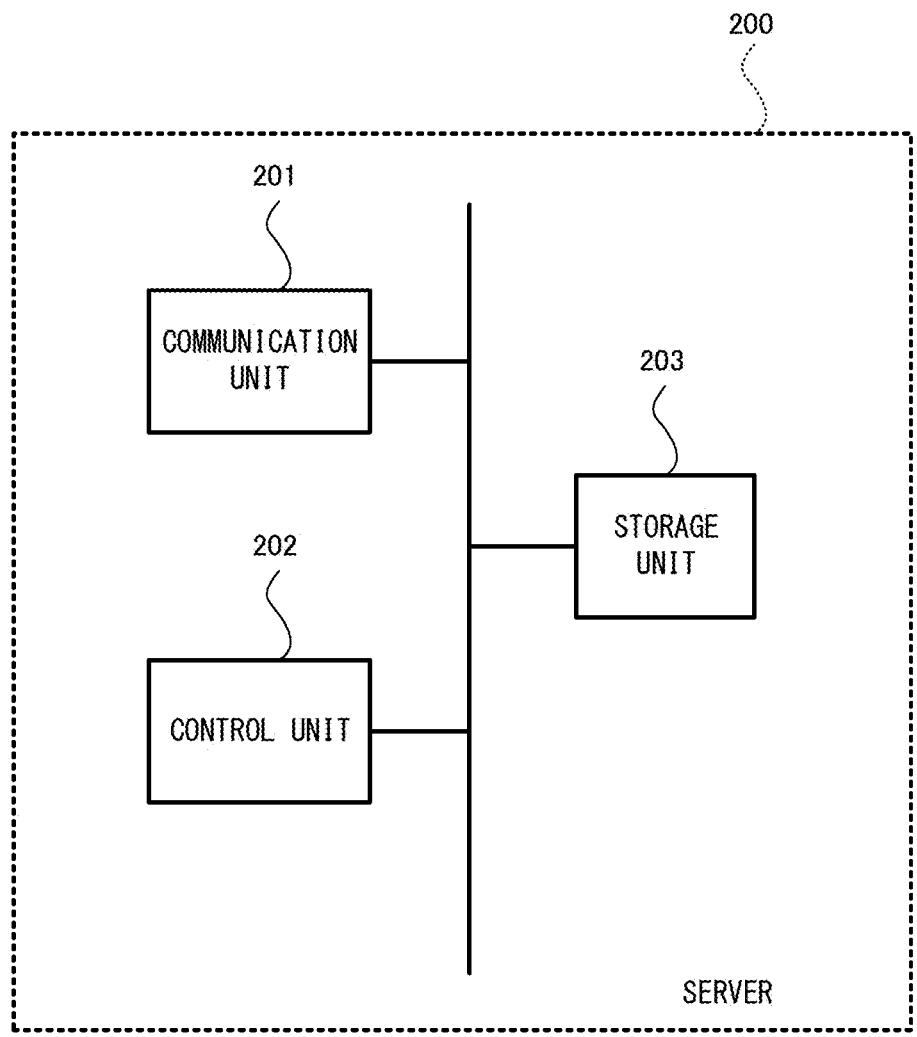
FIG. 3 is a block diagram showing a non-limiting example configuration of a server 200.

Next, the server 200 will be described with reference to FIG. 3. FIG. 3 is a block diagram showing a non-limiting example configuration of the server 200.

The server 200 has a communication unit 201, a control unit 202, and a storage unit 203. The communication unit 201 communicates with the information processing apparatuses 3, etc., through the network 100 by exchanging communication packets. As a non-limiting example, the control unit 202 performs a process of managing the progression of a game performed along with the information processing apparatus 3, a process of managing in-game money (e.g., coins), game items, and game objects (e.g., pieces of equipment used in a game), etc., that are purchased by the user, a process of managing the probability of winning a slot lottery, and a process of managing information about payment or charging. The control unit 202 also establishes a communication link to the information processing apparatuses 3, etc., through the communication unit 201, and performs data transmission control and routing on the network 100. When a game is performed along with a plurality of information processing apparatuses 3, the control unit 202 manages a pairing or grouping of information processing apparatuses 3 that perform the game, and data communication between those information processing apparatuses 3. The storage unit 203 stores programs that are executed by the control unit 202, various items of data used for the above processes, various items of data used for communication with the information processing apparatuses 3, etc. When the system employs a predetermined log-in process for data exchange performed through the network 100, the server 200 may perform an authentication process to determine whether or not a user who tries to log in is an authorized user. The server 200 may be a single server machine or may include a plurality of server machines.

Figure 4:
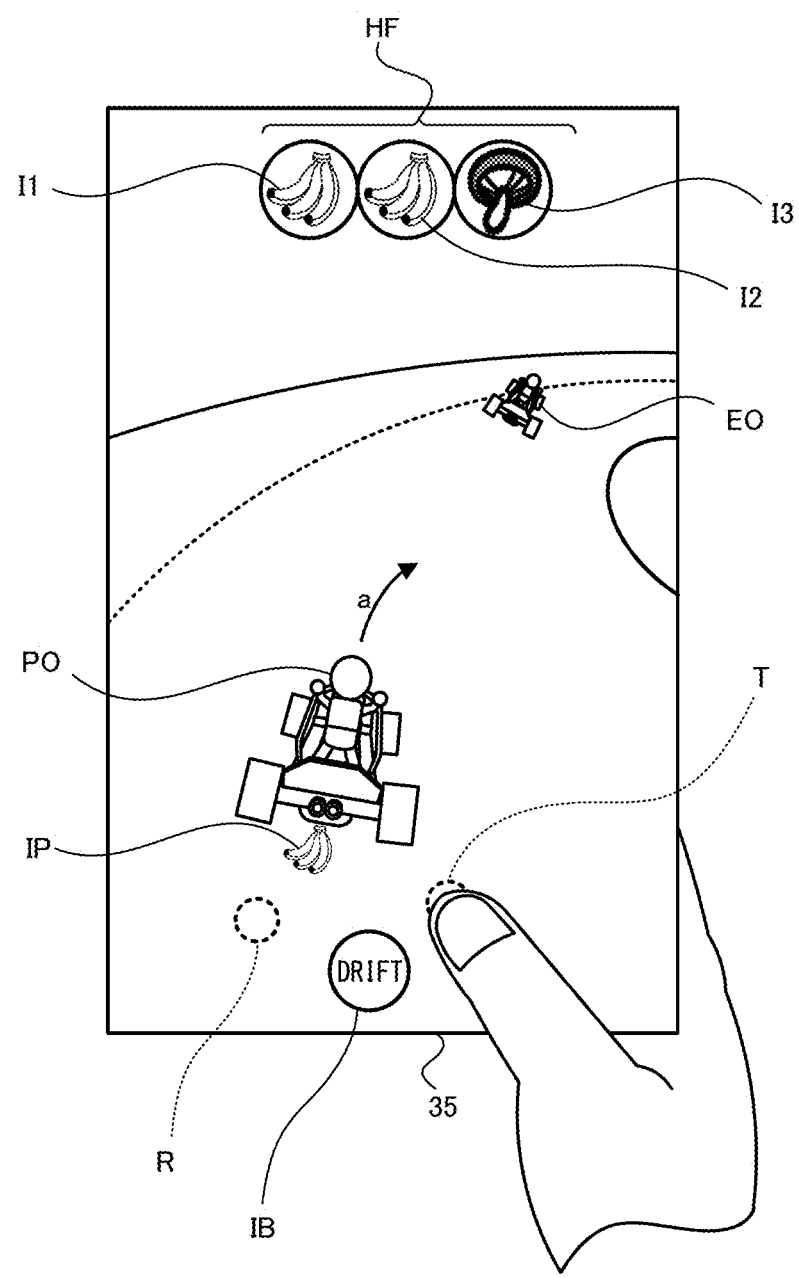
FIG. 4 is a diagram showing a non-limiting example game image displayed on a display unit 35 of the information processing apparatus 3 in a portrait-hold operation in a first mode.
Figure 5:
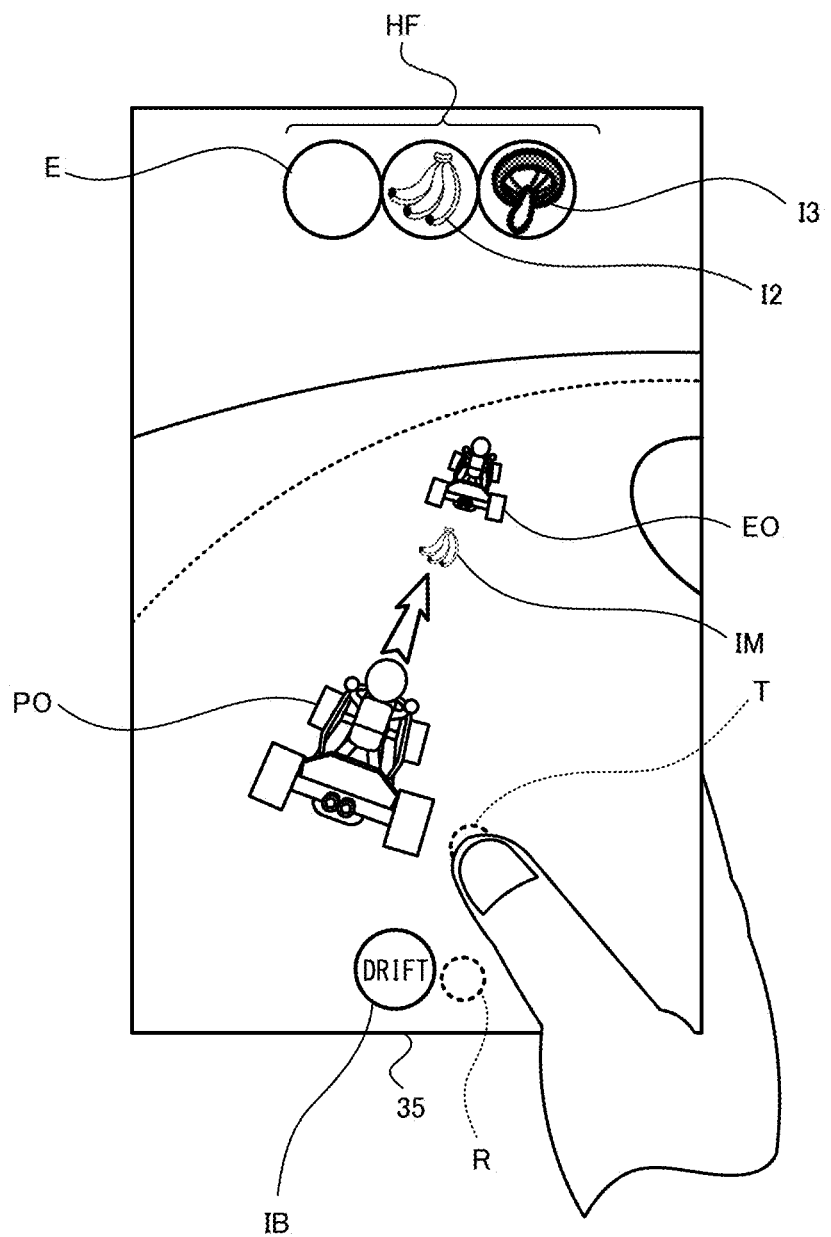
FIG. 5 is a diagram showing a non-limiting example game image displayed on the display unit 35 of the information processing apparatus 3 in a portrait-hold operation in the first mode.
Figure 6:
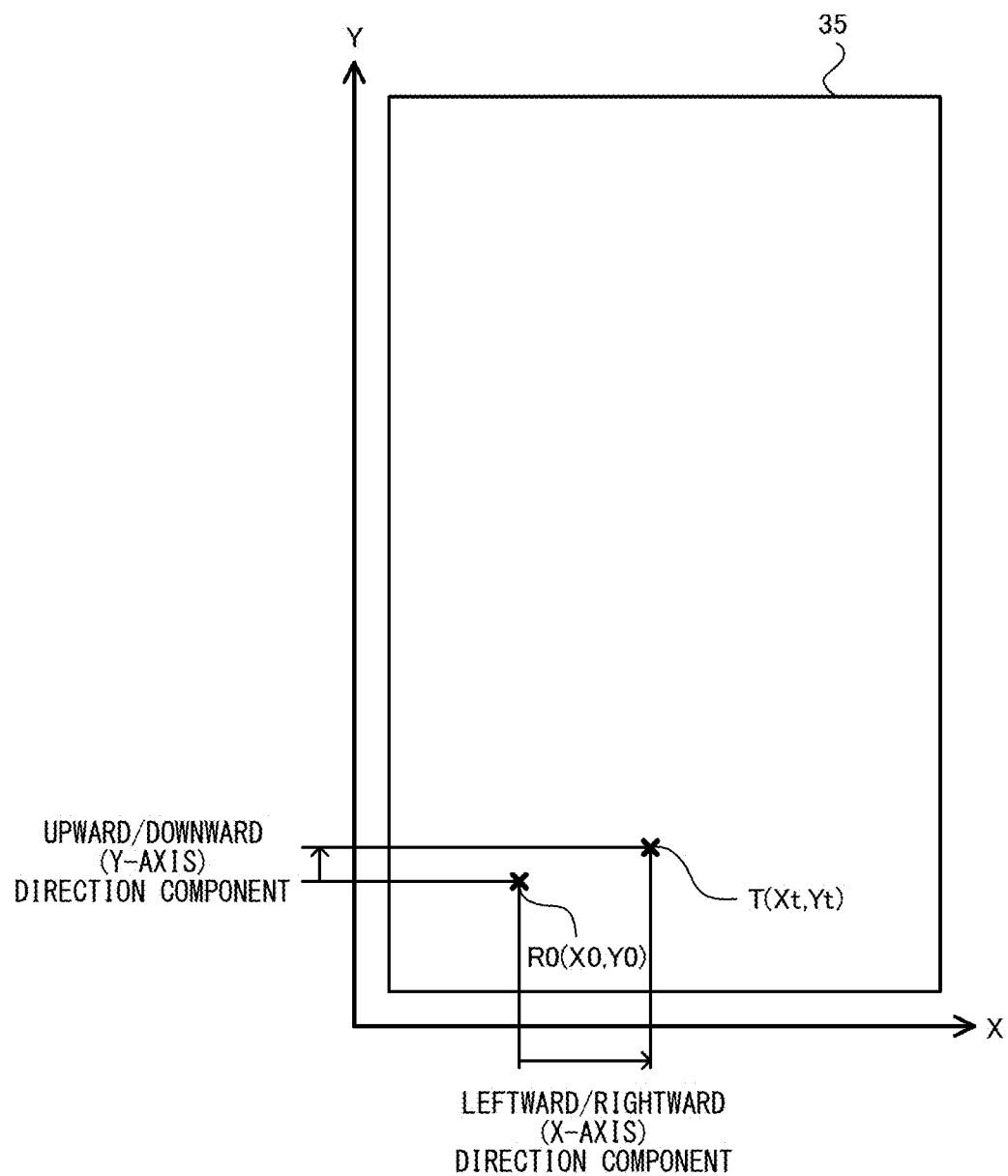
FIG. 6 is a diagram showing a non-limiting example in which a movement direction of a player object PO is controlled with reference to a display screen.
Figure 7:
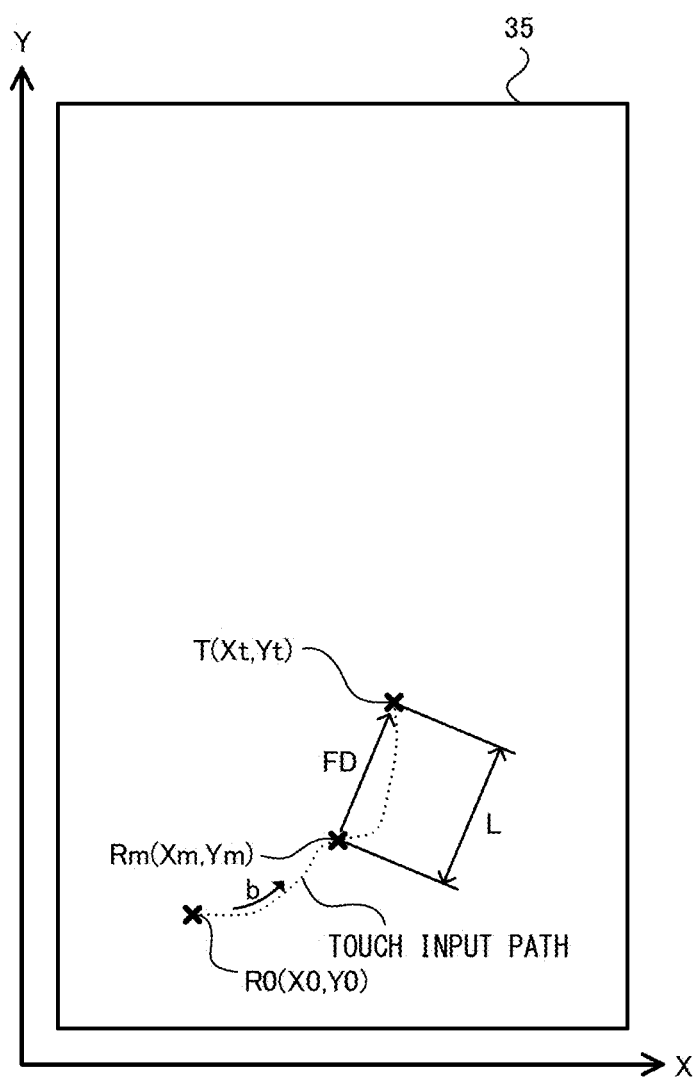
FIG. 7 is a diagram showing a non-limiting example in which an action of firing an item I is controlled with reference to the display screen.
Figure 8:
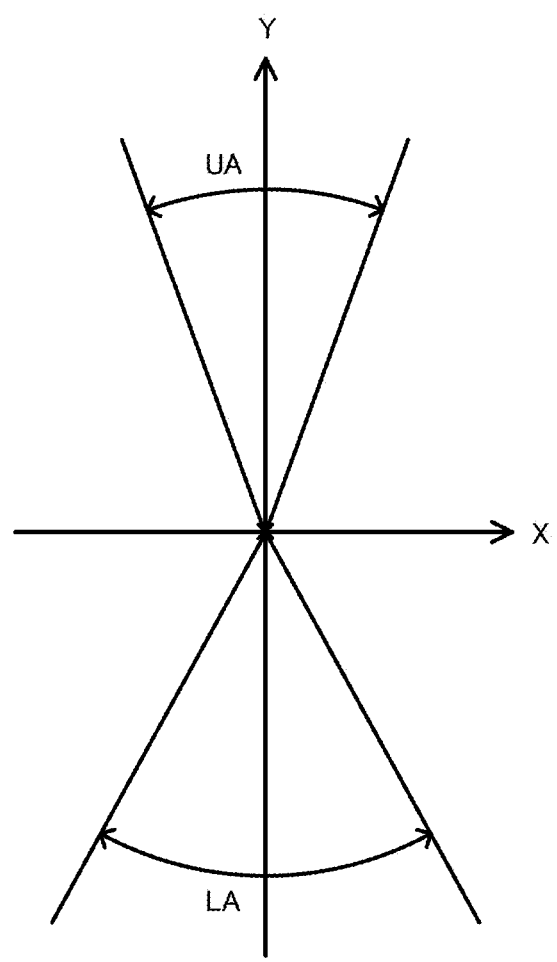
FIG. 8 is a diagram for describing a non-limiting example of determination regions for determining an operation of firing an item I with reference to the display screen.

Next, before describing specific processes performed by the information processing apparatus 3 and the server 200, a non-limiting example movement process and firing process performed in the information processing system 1 will be outlined with reference to FIGS. 4-8. In the non-limiting example movement and firing processes, the information processing system 1 is used to operate a movement direction of a player object PO (movable object) and firing of an item I (another object). It should be noted that FIG. 4 is a diagram showing a non-limiting example game image displayed on the display unit 35 of the information processing apparatus 3. FIG. 5 is a diagram showing a non-limiting example game image displayed on the display unit 35 of the information processing apparatus 3. FIG. 6 is a diagram showing a non-limiting example in which the movement direction of the player object PO is controlled with reference to a display screen. FIG. 7 is a diagram showing a non-limiting example in which an action of firing an item I is controlled with reference to the display screen. FIG. 8 is a diagram for describing non-limiting example determination regions for determining an operation of firing an item I with reference to the display screen. Although, in the description that follows, a game is used as a non-limiting example application executed in the information processing apparatus 3, other applications may be executed in the information processing apparatus 3.

In this non-limiting example, a plurality of operation modes including a first and a second mode are prepared. Specifically, the first mode is a portrait-hold operation mode in which the user holds and operates the display unit 35 with the upward/downward direction of a displayed image in parallel to a first side direction (longer-axis direction) of the display unit 35, and a second side direction (shorter-axis direction) of the display unit 35 close to the horizontal direction of real space (for example, the display unit 35 is held and operated by a single hand, and this holding manner of the display unit 35 is referred to as "portrait-hold" (see FIG. 4)). The second mode is a landscape-hold operation mode in which the user holds and operates the display unit 35 with the upward/downward direction of a displayed image in parallel to the second side direction (shorter-axis direction) of the display unit 35, and the first side direction (longer-axis direction) of the display unit 35 close to the horizontal direction of real space (for example, the display unit 35 is held and operated by both hands, and this holding manner of the display unit 35 is referred to as "landscape-hold" (see FIG. 14)). In the description with reference to FIGS. 4-9, an overview of the above example movement and firing processes is described using a non-limiting example of the portrait-hold operation in the first mode.

In FIG. 4, the display unit 35 of the information processing apparatus 3 being held in portrait position displays a game image corresponding to a game played in the information processing apparatus 3. As a non-limiting example of such a game image, FIG. 4 shows a scene in which the player object PO performs a racing game. For example, in the game, the player object PO sits on a cart and drives the cart on a course provided in a virtual world. On the course, an opponent object(s) EO sits on and drives another cart. These objects compete to be first to reach a goal provided on the course. A virtual camera for generating a game image is disposed behind the player object PO traveling on the course. It should be noted that when the player object PO deviates from the travel direction of the course due to spinning, drifting, etc., the virtual camera may be still disposed at a position where the player object PO is seen from behind the player object PO (i.e., the virtual camera is aimed toward the player object PO), or may be disposed at a position where the player object PO is seen from behind along the travel direction of the course (i.e., the virtual camera is aimed in the travel direction of the course).

As shown in FIG. 4, the movement direction of the player object PO can be controlled by performing an operation of touching the touch panel (input unit 34) provided on the screen of the display unit 35 being held in portrait position. As a non-limiting example, the player object PO is controlled to automatically travel forward along the course, and the leftward/rightward movement direction of the player object PO is controlled by the user's operation (e.g., a steering operation). Specifically, when a touch operation of swiping rightward is performed with reference to the position where the touch panel of the display unit 35 being held in portrait position was first touched (initial touch position), the movement direction of the player object PO is changed to a rightward direction. When a touch operation of swiping leftward is performed with reference to an initial touch position on the touch panel of the display unit 35 being held in portrait position, the movement direction of the player object PO is changed to a leftward direction. For example, FIG. 4 shows a reference position R indicating a set reference coordinate point (e.g., an initial touch position on the touch panel), and a touch position T indicating a current touch position (actually, images indicating the reference position and the current touch position are not displayed on the display unit 35, while the reference position R indicating the reference position and the touch position T indicating the touch position are each indicated by a dashed line for the sake of convenience in FIGS. 4 and 5). Because the touch position T is located to the right of the reference position R, the movement direction of the player object PO is changed to a rightward direction (direction "a" in FIG. 4). It should be noted that the player object PO may not be controlled to automatically travel forward along the course, and may be caused to travel according to the user's acceleration operation. The player object PO may also be controlled to be automatically steered to turn left and right along the course. For example, when the course curves to the right, the movement direction of the player object PO may be changed to a rightward direction to some extent even without the user's steering operation, and in this case, when the user performs a rightward steering operation, the movement direction of the player object PO may be changed to a rightward direction to a further extent. It should be noted that the control of the movement direction of the player object PO corresponds to a non-limiting example of a first control.

The display unit 35 also displays a mode change button IB for giving an instruction to perform control related to movement of the player object PO. Here, the mode change button IB is an image indicating a touch region for selecting a movement (travel) mode of the player object PO corresponding to the swiping touch operation. Specifically, the mode change button IB shown in FIG. 4 is displayed at or near the center of a lower portion of the display screen with the display unit 35 held in portrait position to indicate a circular region that is used in a touch operation, at that position, and a selectable travel mode ("drift" in the non-limiting example of FIG. 4) is indicated in the circular region. When an operation of first touching followed by swiping is performed inside the circular region indicated by the mode change button IB, the player object PO changes the movement direction to the direction of that swiping in the travel mode specified by the mode change button IB (in the non-limiting example of FIG. 4, the player object PO changes the movement direction while drifting). When an operation of first touching followed by swiping is performed outside the circular region indicated by the mode change button IB, the player object PO changes the movement direction to the direction of that swiping in a normal travel mode (in the non-limiting example of FIG. 4, a travel mode in which travel is performed by operating a "steering wheel"). It should be noted that a travel mode which can be specified using the mode change button IB may be previously specified according to the user's operation. As a non-limiting example, if the travel mode in which travel is performed by operating a "steering wheel" has been set by the user's operation using the mode change button IB, the player object PO may change the movement direction in the travel mode in which travel is performed by operating a "steering wheel" when an operation of first touching followed by swiping is performed inside the circular region indicated by the mode change button IB, and may change the movement direction while drifting when an operation of first touching followed by swiping is performed outside the circular region indicated by the mode change button IB. Alternatively, a plurality of mode change buttons IB indicating different travel modes may be displayed on the display unit 35. It should be noted that the mode change button IB corresponds to a non-limiting example of a first image for giving an instruction to perform control related to a first control.

An action of the player object PO firing a possessed item I can be controlled by performing a touch operation on the touch panel of the display unit 35 being held in portrait position. For example, a plurality of possession frames HF each showing an item I possessed by the player object PO is provided in an upper portion of the display screen of the display unit 35 being held in portrait position. In the non-limiting example possession frames HF of FIG. 4, three items I1, I2, and I3 can be possessed by the respective possession frames. One of the items I in the possession frames HF possessed by the player object PO is displayed, as a ready-to-use item IP, at a ready-to-use position behind the cart of the player object PO. For example, the ready-to-use item IP is one of the items I in the possession frames HF that was acquired earliest. In the non-limiting example of FIG. 4, the item I1 (a bunch of bananas) displayed in the leftmost possession frame HF is displayed as the ready-to-use item IP at the ready-to-use position. It should be noted that control of an operation of firing an item I corresponds to a non-limiting example of a second control.

In FIG. 5, when a touch operation of swiping the touch panel of the display unit 35 being held in portrait position upward is performed, then if the ready-to-use item IP disposed at the ready-to-use position of the player object PO is fireable, the item IP is fired as a projectile item IM toward the front of the player object PO. It should be noted that the ready-to-use item IP and the projectile item IM are typically the same object, and alternatively may be different objects. Some types of ready-to-use items IP (e.g., a banana item) disposed at the ready-to-use position may be fired as the projectile item IM toward the back of the player object PO when a touch operation of swiping the touch panel of the display unit 35 being held in portrait position downward is performed. It should be noted that if the direction in which the ready-to-use item IP disposed at the ready-to-use position of the player object PO is fired is fixed, the item IP may be fired as the projectile item IM in the fixed firing direction no matter whether a touch operation of swiping the touch panel of the display unit 35 being held in portrait position is performed upward or downward. Some types of ready-to-use items IP disposed at the ready-to-use position may not be fired from the player object PO and may be used by the player object PO itself. In this case, when a touch operation of swiping the touch panel of the display unit 35 being held in portrait position upward or downward is performed, the ready-to-use item IP disposed at the ready-to-use position of the player object PO is used by the player object PO. It should be noted that the possession frames HP may be disposed in the virtual space, or may be disposed, overlaying the display screen.

When the player object PO fires the projectile item IM, an effect that is advantageous to the progression of a race performed by the player object PO can be obtained, depending on the type of the projectile item IM. For example, when the projectile item IM indicating a carapace collides with the opponent object EO, the collision may decelerate or stop, i.e., obstruct, the traveling of the opponent object EO, and may cause damage to the opponent object EO, depending on the extent of the collision. When the projectile item IM indicating a bunch of bananas collides with the opponent object EO, the projectile item IM may affect the opponent object EO such that the opponent object EO slips on a road, so that the traveling of the opponent object EO is decelerated or stopped. It should be noted that the projectile item IM representing a carapace and the projectile item IM representing a banana correspond to a non-limiting example of an attack item that decelerates or stops an object colliding therewith.

Alternatively, the use of the ready-to-use item IP may temporarily increase the ability of the player object PO itself for a predetermined period of time. For example, when the ready-to-use item IP indicating a mushroom is used, the speed of the player object PO is increased for a predetermined period of time. It should be noted that the use of the ready-to-use item IP may provide an effect of increasing the size of the player object PO itself for a predetermined period of time or an effect of increasing in-game coins possessed by the player object PO.

When an item I has been used, the item I is not currently possessed by the player object PO, and therefore, the ready-to-use item IP displayed at the ready-to-use position is erased, and the item I in the possession frame HF corresponding to the ready-to-use item IP is also erased (in the non-limiting example of FIG. 5, the item I1 displayed in the leftmost possession frame HF). As a result, the possession frame HF that has displayed the item I that was fired as the projectile item IM is changed to an empty frame E in which no item I is displayed. For example, in the game, the player object PO is sitting on and driving a cart on a course provided in a virtual world, and can acquire a new item I by passing by or through an item box IB placed on the course and thereby opening the item box IB. It should be noted that the player object PO can acquire a new item I only if there is a possession frame HF that is an empty frame E.

As described above, in the non-limiting example movement and firing processes performed in the first mode in the information processing system 1, the movement direction of the player object PO is changed when a swipe input to the touch panel of the display unit 35 being held in portrait position is performed leftward or rightward, and the firing operation of the item I is controlled when a swipe input to the touch panel is performed upward or downward. A non-limiting example in which the direction of a swiping input is determined will now be described with reference to FIGS. 6 and 7.

In FIG. 6, the leftward/rightward movement direction of the player object PO is set according to the leftward/rightward component in the display screen of a swipe input to the touch panel of the display unit 35 being held in portrait position. Specifically, in a touch operation on the touch panel, a reference coordinate point R0 where the touch panel is first touched, and a current touch position coordinate point T of a swipe operation performed, continuously following the initial touch, are set based on the display screen coordinate system of the display unit 35. For example, as shown in FIG. 6, in the display screen of the display unit 35 being held in portrait position, defined is a display screen coordinate system in which the X-axis (the rightward direction is the positive direction of the X-axis) is a first axis that extends in the leftward/rightward direction (shorter-axis direction) of the display screen, and the Y-axis (the upward direction is the positive direction of the Y-axis) is a second axis which extends in the upward/downward direction (longer-axis direction) of the display screen and is orthogonal to the first axis. In this case, the reference coordinate point is set as R0(X0, Y0), and the current touch position coordinate point T is set as T(Xt, Yt). In this case, the leftward/rightward component (X-axis direction component) in the display screen of a swipe input is calculated by Xt−X0, and the upward/downward component (Y-axis direction component) in the display screen of the swipe input is calculated by Yt−Y0. In the non-limiting example, if the X-axis direction component Xt−X0 has a positive value, the movement direction of the player object PO is changed to a rightward direction by a steering wheel angle corresponding to the absolute value of Xt−X0. If the X-axis direction component Xt−X0 has a negative value, the movement direction of the player object PO is changed to a leftward direction by a steering wheel angle corresponding to the absolute value of Xt−X0. Thereafter, when the touch is released from the touch panel, the reference coordinate point R0 and the current touch position coordinate point T are initialized, and the movement direction of the player object PO is changed such that the steering wheel angle is returned to the straight-ahead position by a predetermined change amount.

It should be noted that the steering wheel angle corresponding to the absolute value of Xt−X0 may be changed, depending on the position of the player object PO on the course. For example, when the player object PO is traveling at a center of the course, the steering wheel angle set according to the user's operation may be relatively increased, and when the player object PO is traveling at an end of the course, the steering wheel angle set according to the user's operation may be relatively decreased. The cart being driven by the player object PO may slip, i.e., drift, depending on the steering wheel angle set according to the user's operation, the course conditions, the performance of the cart, the selected travel mode, etc. In this case, the movement direction of the cart of the player object PO is not consistent with the steering wheel angle, and as a result, the movement direction of the player object PO may not completely be consistent with the magnitude of the leftward/rightward component of a swipe input to the touch panel.

In FIG. 7, an action of firing an item I is controlled according to the upward/downward component in the display screen of a swipe input to the touch panel of the display unit 35 being held in portrait position. Specifically, in a touch operation on the touch panel, a reference coordinate point Rm where the touch panel is first touched (the same position as that of the reference coordinate point R0 when the touch panel is first touched), and a current touch position coordinate point T of a swipe operation performed, continuously following the initial touch, are set based on the display screen coordinate system of the display unit 35. For example, as shown in FIG. 7, as in FIG. 6, in the display screen of the display unit 35 being held in portrait position, defined is a display screen coordinate system in which the X-axis (the rightward direction is the positive direction of the X-axis) is a first axis that extends in the leftward/rightward direction (the shorter-axis direction) of the display screen, and the Y-axis (the upward direction is the positive direction of the Y-axis) is a second axis that extends in the upward/downward direction (the longer-axis direction) of the display screen and is orthogonal to the first axis. In this case, the reference coordinate Rm is set as Rm(Xm, Ym), and the current touch position coordinate point T is set as T(Xt, Yt). Thereafter, a vector FD from the reference coordinate point Rm to the current touch position coordinate point T is calculated, and based on the direction of the vector FD, it is determined whether the direction of the swipe input to the touch panel of the display unit 35 being held in portrait position is upward or downward.

In the process of determining the upward/downward component in the display screen of a swipe input to the touch panel of the display unit 35 being held in portrait position, a positional relationship between the reference coordinate point Rm and the current touch position coordinate point T is maintained to satisfy a predetermined condition. If the condition fails to be satisfied, the reference coordinate point Rm is moved so as to satisfy the condition. For example, the length of a path of touch positions (touch input path) formed between the reference coordinate point Rm and the current touch position coordinate point T is greater than a threshold L, the reference coordinate point Rm is moved on the touch input path toward the current touch position coordinate point T (a direction "b" in FIG. 7) such that the length becomes smaller than or equal to the threshold L. Thus, when the touch panel is first touched, the reference coordinate point Rm is set at the position where the touch panel is first touched, and subsequently, when the current touch position coordinate point T is located at least a threshold L away from the reference coordinate point Rm, the reference coordinate point Rm is moved, following the current touch position coordinate point T. It should be noted that the reference coordinate point Rm that is moved on the touch input path toward the current touch position coordinate point T such that the length becomes smaller than or equal to the threshold L, may be moved until the length becomes equal to the threshold L, at a predetermined rate corresponding to the time it takes for the length to become smaller than or equal to the threshold L. Alternatively, the reference coordinate point Rm may be moved such that the length instantaneously becomes smaller than or equal to the threshold L. In the process of moving the reference coordinate point Rm toward the current touch position coordinate point T, touch position coordinate points T that were recorded in the past and are the threshold L or greater away from the current touch position coordinate point T may be successively erased based on the predetermined rate, and the touch position coordinate point T that becomes most previous due to the erasing process may be set as the reference coordinate point Rm. Thus, by causing the reference coordinate point Rm to move along the touch input path, the positional relationship between the reference coordinate point Rm and the current touch position coordinate point T is maintained such that the touch input path length therebetween is smaller than or equal to L, and the vector FD from the moved reference coordinate point Rm to the current touch position coordinate point T is calculated. It should be noted that while a touch input is being performed, the reference coordinate point Rm may be moved on the touch input path such that the reference coordinate point Rm invariably approaches the current touch position coordinate point T even when the length of the touch input path between the reference coordinate point Rm and the current touch position coordinate point T is smaller than the threshold L.

If the length of the vector FD is greater than or equal to a predetermined length and the direction of the vector FD is within a determination region, it is determined that a swipe input to the touch panel of the display unit 35 being held in portrait position in the upward or downward direction of the display screen has been performed, and the ready-to-use item IP is fired as the projectile item IM in a direction based on the determination. For example, as shown in FIG. 8, a predetermined angle range around the positive direction of the Y-axis as a center thereof is set as a forward-direction determination region UA, and a predetermined angle range around the negative direction of the Y-axis as a center thereof is set as a backward-direction determination region LA. If the length of the vector FD is greater than or equal to the predetermined length and the direction of the vector FD is within the forward-direction determination region UA, the ready-to-use item IP is fired as the projectile item IM toward the front of the player object PO (e.g., directly toward the front of the player object PO). In the case where the ready-to-use item IP is fireable toward the back of the player object PO, if the length of the vector FD is greater than or equal to the predetermined length and the direction of the vector FD is within the backward-direction determination region LA, the ready-to-use item IP is fired as the projectile item IM toward the back of the player object PO (e.g., directly toward the back of the player object PO).

It should be noted that the angle range of the backward-direction determination region LA may be set greater than the angle range of the forward-direction determination region UA. Typically, the downward swipe input using a touch panel is more difficult than the upward swipe input. This is particularly significant when a touch operation is performed using the thumb of a hand holding the information processing apparatus 3. Therefore, if the condition for determining the relatively difficult swipe input is relatively relaxed, operability can be improved. In addition, the predetermined length for determining the length of the touch input path formed between the reference coordinate point Rm and the current touch position coordinate point T may be a threshold that is changed, depending on the direction in which the length is determined. In order to relax the condition for determining the relatively difficult swipe input for the above reason, the length of the touch input path required for determination of whether or not a swipe input is within the backward-direction determination region LA may be smaller than the length of the touch input path required for determination of whether or not a swipe input is within the forward-direction determination region UA. While, in the above process, the reference coordinate point Rm is assumed to move along the touch input path, the movement of the reference coordinate point Rm is not limited to this. For example, the reference coordinate point Rm may be moved on a straight line connecting between the reference coordinate point Rm and the current touch position coordinate point T toward the current touch position coordinate point T such that the linear distance therebetween becomes smaller than or equal to a threshold L. Alternatively, the reference coordinate point Rm may be fixed to the same position as that of the reference coordinate point R0, i.e., an initial touch position. It should be noted that the forward-direction determination region UA and the backward-direction determination region LA set within different angle ranges correspond to a non-limiting example of a reference value having a different value.

The length of the touch input path formed between the reference coordinate point Rm and the current touch position coordinate point T, which is used in the input determination, may be replaced with other parameters. As a first non-limiting example, the length of the touch input path formed between the reference coordinate point Rm and the current touch position coordinate point T may be replaced with the linear distance between the reference coordinate point Rm and the current touch position coordinate point T. As a second non-limiting example, the length of the touch input path formed between the reference coordinate point Rm and the current touch position coordinate point T may be replaced with the length of the Y-axis component of the vector FD. As a third non-limiting example, the length of the touch input path formed between the reference coordinate point Rm and the current touch position coordinate point T may be replaced with the length of the vector FD.

The process of determining the upward/downward component in the display screen of a swipe input to the touch panel of the display unit 35 being held in portrait position may be performed without the use of the reference coordinate point Rm. As a first non-limiting example, when the change rate of a touch position in swiping to the current touch position coordinate point T (e.g., the length between the previously detected touch position coordinate point T to the currently detected touch position coordinate point T, or the length of a touch input path immediately previously detected for a predetermined period of time) is greater than or equal to a reference value, then if the direction of the swipe input whose change rate has been detected is within the forward-direction determination region UA or the backward-direction determination region LA, it may be determined that the swipe input to the touch panel has been performed in the upward direction or the downward direction of the display screen. As a second non-limiting example, when the change rate of a touch position in swiping to the current touch position coordinate point T is greater than or equal to the reference value, then if the length of the Y-axis direction component of the swipe input whose change rate has been detected is greater than or equal to the predetermined length, it may be determined that the swipe input to the touch panel has been performed in the upward direction or the downward direction of the display screen.

The predetermined length that is a reference value for determining the length of the touch input path formed between the reference coordinate point Rm and the current touch position coordinate point T may be changed, depending on the user's swipe input. For example, if the magnitude of the leftward/rightward component Xt–X0 of the swipe input is greater than or equal to a predetermined threshold, the predetermined length that is the reference value may be changed. As a non-limiting example, when the magnitude of the leftward/rightward component Xt–X0 of the swipe input is greater than or equal to the predetermined threshold, then if the predetermined length that is the reference value is increased, the player object PO's operation of greatly turning the steering wheel to the left or right, or the player object PO's operation of performing so-called drifting, i.e., an operation of performing a swipe input having a great change amount, can be prevented from being determined to be an operation of firing an item forward or backward, which is not actually intended by the user. As another non-limiting example, when the magnitude of the leftward/rightward component Xt–X0 of a swipe input is greater than or equal to the predetermined threshold, then if the predetermined length that is the reference value is decreased, an operation of firing an item I can be performed during the player object PO's operation of greatly turning the steering wheel to the left or right, or the player object PO's operation of performing so-called drifting, without a significant influence of the firing operation on the leftward/rightward movement direction.

In the above non-limiting example, if the conditions that the length of the touch input path formed between the reference coordinate point Rm and the current touch position coordinate point T is greater than or equal to a predetermined length, and the direction of the vector FD is within a determination region, are satisfied, the projectile item IM is fired directly toward the front or back of the player object PO. This can avoid the situation that if only the upward/downward component of a swipe input is used in the determination, it may be determined that the user instructs to fire even when the user intends to and actually performs a leftward/rightward swipe input, because the swipe input contains an upward/downward component. By setting the above conditions, an input can be correctly determined. In addition, by limiting the firing direction to the direct forward direction or direct backward direction of the player object PO, an input error from that direction can be accommodated, and therefore, the difficulty of the operation can be taken into consideration. However, in the case where such an effect is not desired, the direction in which the projectile item IM is fired may deviate from the direct forward direction or direct backward direction of the player object PO. For example, if the direction of the vector FD is within the forward-direction determination region UA, the projectile item IM may be fired in a direction deviating from the direct forward direction of the player object PO by an angle difference between the positive direction of the Y-axis and the direction of the vector FD. Also, if the direction of the vector FD is within the backward-direction determination region LA, the projectile item IM may be fired in a direction deviating from the direct backward direction of the player object PO by an angle difference between the negative direction of the Y-axis and the direction of the vector FD.

The direction in which the projectile item IM is fired may be varied, depending on the type of the player object PO or a piece of equipment used by the player object PO (e.g., a cart driven by the player object PO).

In the above description, the magnitude of the leftward/rightward component in the display screen of a swipe input to the touch panel of the display unit 35 being held in portrait position that is calculated for a steering operation is the magnitude of the first-axis (shorter-axis) direction component of the difference between the reference coordinate point R0 where the touch panel is first touched and the current touch position coordinate point T in a swipe operation performed, continuously following the initial touch, or alternately, may be the reference coordinate point Rm that is moved, following the current touch position coordinate point T. In that case, the magnitude of the leftward/rightward component in the display screen of a swipe input is the magnitude of the first-axis (shorter-axis) direction component of the difference between the reference coordinate point Rm that is moved, following the current touch position coordinate point T, and the current touch position coordinate point T in a swipe operation performed, continuously following the initial touch.

Concerning the use of an item, an item I in a possession frame HF or the ready-to-use item IP at the ready-to-use position, which is displayed on the display screen, may be used by performing a touch operation (e.g., tap operation) on that item displayed on the touch panel. Specifically, the ready-to-use item IP is used at the timing that that item on the touch panel is first touched or at the timing that a touch is released from that item on the touch panel after being first touched thereon. In this case, if the item operated by such a touch operation is a type of object that is fireable from the player object PO, the direction in which the item is to be fired may be set to a default direction. It should be noted that even when an item I in a possession frame HF or the ready-to-use item IP at the ready-to-use position, which is displayed on the display screen, is used by performing a touch operation on that item on the touch panel, the direction in which that item is fired may be changed, depending on the direction of a swipe operation (drag operation) (e.g., the upward direction or downward direction of the display unit 35 being held in portrait position).

The sizes of the determination regions for determining the input direction (the forward-direction determination region UA and the backward-direction determination region LA) may be changed, depending on the action of the player object PO. For example, when the player object PO performs an action of facing in a direction different from the direction of the steering wheel angle (e.g., a drifting action, a spinning action, etc.), the sizes of the determination regions may be changed and reduced. When the player object PO performs an action of facing in a direction different from the direction of the steering wheel angle, the direction input by the user may fall within a determination region despite the operating user's intention. Therefore, by reducing the determination regions according to the action of the player object PO, the operation determination can be less likely to be contrary to the user's intention.

In the above description, the movement direction of the player object PO is controlled based on the magnitude of the leftward/rightward component of a swipe input to the touch panel of the display unit 35 being held in portrait position. As long as at least the magnitude of the leftward/rightward component is used, other operations and other direction components may additionally be used. As a non-limiting example, only if a predetermined operation (e.g., an operation of pressing down a predetermined operation button, or a touch operation on a predetermined operation button image) is being performed, the movement direction of the player object PO may be controlled based on the magnitude of the leftward/rightward component of a swipe input to the touch panel of the display unit 35 being held in portrait position. As another non-limiting example, the movement direction of the player object PO may be controlled based on the magnitude of the leftward/rightward component of a swipe input to the touch panel of the display unit 35 being held in portrait position, and in addition, at least a portion of the upward/downward component thereof. In this case, the leftward/rightward movement direction of the player object PO is controlled based on the upward/downward component and leftward/rightward component of a swipe input. As a non-limiting example, a rightward steering amount may be set to 2 if the leftward/rightward component and upward/downward component of a swipe input are +1.73 and +1.00, respectively.

The action for an item I is controlled based on the upward/downward component of a swipe input to the touch panel of the display unit 35 being held in portrait position. As long as at least the upward/downward component is used, other operations and other direction components may additionally be used. As a non-limiting example, only if a predetermined operation (e.g., an operation of pressing down a predetermined operation button, or a touch operation on a predetermined operation button image) is being performed, the action for an item I may be controlled based on the magnitude of the upward/downward component of a swipe input to the touch panel of the display unit 35 being held in portrait position. As another non-limiting example, the action for an item I may be controlled based on the upward/downward component and leftward/rightward component of a swipe input to the touch panel of the display unit 35 being held in portrait position. In this case, the firing of an item I may be controlled based on the upward/downward component of a swipe input, and the direction of the item I fired may be controlled based on the leftward/rightward component of the swipe input.

While, in the above description, the movement direction of the player object PO is controlled based on the magnitude of the leftward/rightward component of a swipe input to the touch panel of the display unit 35 being held in portrait position, other elements may be controlled. For example, in the case where a game image as viewed from the player object PO (i.e., a subjective view) is displayed, the movement direction of a virtual camera for generating the game image may be controlled based on the magnitude of the leftward/rightward component of a swipe input to the touch panel of the display unit 35 being held in portrait position. In addition, although the action for an item I is controlled based on the upward/downward component of a swipe input to the touch panel of the display unit 35 being held in portrait position, other elements may be controlled. For example, actions such as an action of firing a beam, an action of changing pieces of equipment, an action of changing targets, and an action of changing viewing fields or viewing directions, may be controlled based on the upward/downward component of a swipe input to the touch panel of the display unit 35 being held in portrait position.

In the above non-limiting example, if the conditions that the length of the vector FD is greater than or equal to a predetermined length and the direction of the vector FD is within a determination region are satisfied, the ready-to-use item IP is fired as the projectile item IM in a direction based on the determination. Alternatively, the ready-to-use item IP may be fired as the projectile item IM with other timing. For example, if the conditions that the length of the vector FD is greater than or equal to a predetermined length and the direction of the vector FD is within a determination region are satisfied, then when a touch is released from the touch panel, the ready-to-use item IP may be fired as the projectile item IM in a direction based on the determination.

While, in the above non-limiting example, the position (ready-to-use position) where an item I is fired as the projectile item IM is set to a rear portion of the cart driven by the player object PO, an item I may be fired at other positions. As a non-limiting example, the projectile item IM may be fired from other portions of the cart driven by the player object PO, such as a front portion of the cart driven by the player object PO, or from near the cart. As another non-limiting example, the ready-to-use position may be set at a firing position provided at an upper or lower end of the display screen or outside the course, and the projectile item IM may be fired from such a position away from the cart driven by the player object PO.

The speed at which the fired projectile item IM moves may be set according to the type of the projectile item IM, or may be changed according to the user's input. For example, the speed at which the fired projectile item IM moves may be changed according to the speed of a swipe input for firing the projectile item IM (the speed at which a touch position is moved during the swipe input).

In the above description, if the length of the vector FD is greater than or equal to a predetermined length and the direction of the vector FD is within a determination region, it is determined that a swipe input has been performed on the touch panel of the display unit 35 being held in portrait position in the upward direction or downward direction of the display device, and the ready-to-use item IP is fired as the projectile item IM in a direction based on the determination. Alternatively, the direction of a swipe input may be determined using the touch input path. For example, if the length of the touch input path formed between the reference coordinate point Rm and the current touch position coordinate point T is greater than or equal to a predetermined length, and the direction of the vector FD is within a determination region, it may be determined that a swipe input has been performed on the touch panel of the display unit 35 being held in portrait position in the upward direction or downward direction of the display device.

Here, in the case where the direction of a swipe input is determined using the difference between a touch position coordinate point T a predetermined time before and a current touch position coordinate point T, the determination of the swipe input direction is not completed until the predetermined time has passed since the initial touch. As a non-limiting example, in the case where the determination of the swipe input direction is performed using a condition that the difference between the touch position coordinate point T of a touch performed 0.5 sec before and the current touch position coordinate point T is greater than or equal to a predetermined value, the swipe input determination may not be performed for 0.5 sec even when great swiping is performed immediately after the initial touch. This may reduce responsiveness for firing an item, which may feel unnatural to the user. Meanwhile, in the case where the swipe input direction is determined using the length of the touch input path formed between the reference coordinate point Rm and the current touch position coordinate point T, when great swiping is performed immediately after the initial touch, the swipe input direction is immediately determined, and therefore, responsiveness for firing an item is improved, so that the user does not feel unnatural.

It should be noted that as described above, when the length of the touch input path is greater than the threshold L, more previous records are deleted from the records of touch position coordinate points T at a predetermined rate until the length of the touch input path is smaller than the threshold L, and after the deletion, the most previous touch position coordinate point T is set as the reference coordinate point Rm. Thus, when the length of the touch input path is greater than the threshold L, the process of resetting a more recent touch position coordinate point T of the records of touch position coordinate points T as a new reference coordinate point Rm is repeatedly performed until the length of the touch input path is smaller than or equal to the threshold L. The resultant touch input path and reference coordinate point Rm are used to perform the above determination of the swipe input direction. In the case where the process of resetting a more recent touch position coordinate point T of the records of touch position coordinate points T as a new reference coordinate point Rm is thus performed, it is desirable that the "predetermined length" in the above condition that the length of the touch input path formed between the reference coordinate point Rm and the current touch position coordinate point T is greater than or equal to a predetermined length, which is a determination condition for determining that a swipe input has been performed, should be set smaller than the threshold L.

Alternatively, the reference coordinate point Rm may be reset based on a period of time for which a touch input is being performed. For example, only a portion of the records of touch position coordinate points T stored as the touch input path formed between the reference coordinate point Rm and the current touch position coordinate point T that corresponds to a predetermined number of times of processing (e.g., five records of touch position coordinate points T corresponding to five frames) may be stored, and the swipe input direction may be determined using the portion of the records. As a non-limiting example, a value obtained by comparing a touch position coordinate point T that is the most previous of the records and the current touch position coordinate point T that is the most recent record may be used as the touch input path. In this case, the touch position coordinate point T that is the most previous record serves as the reference coordinate point Rm. Thus, when the length of a touch input time for which a touch operation is continued to generate a touch input path is greater than a predetermined time (e.g., five frames), the process of resetting a newer touch position coordinate point T of the records of touch position coordinate points T as a new reference coordinate point Rm is repeatedly performed so that the time it takes to generate the touch input path becomes smaller than or equal to the predetermined period of time, and the resultant touch input path and reference coordinate point Rm are used to perform the above determination of the swipe input direction. It should be noted that if the records are not many enough for the predetermined number of times of processing, a value obtained by comparing a touch position coordinate point T that is the most previous record and the current touch position coordinate point T that is the most recent record may be used as the touch input path. It should be noted that these features of resetting of the reference coordinate point Rm based on the period of time for which a touch input is being performed can be applied, as appropriate, to either the process using the "vector FD" or the process using the "touch input path."

The predetermined length that is a threshold for determining the length of the vector FD or the length of the touch input path may be set differently between the determination of an upward swipe operation and the determination of a downward swipe operation. As a non-limiting example, the predetermined length set for the determination of a downward swipe operation may be smaller than the predetermined length set for the determination of an upward swipe operation so that a downward swipe operation that is relatively difficult can be more easily determined.

The predetermined length that is a threshold for determining the length of the vector FD or the length of the touch input path may be changed, depending on a period of time that has passed since the initial touch. As a non-limiting example, if the period of time for which a touch operation is continued is less than 0.2 sec, that period of time may be 0.25 times as long as the threshold that is set when the period of time is longer than or equal to 0.2 sec. As a result, when a swipe operation is performed immediately after the initial touch, the swipe operation can be easily determined.

The predetermined length that is a threshold for determining the length of the vector FD or the length of the touch input path may be set differently between the determination of a swipe operation in one direction and the subsequent determination of a swipe operation in the other direction. As a non-limiting example, when a touch operation is continued even after it is determined that a swipe operation has been performed in one of the upward direction and the downward direction, the predetermined length for determining a swipe operation in the other of the upward direction and the downward direction may be increased by a factor of 1.5. As a result, even in the case where the user tends to move their finger performing a touch operation backward to return the finger to the original touch position after performing a swipe operation in one direction, the determination of a swipe operation performed despite the user's intention can be prevented. It should be noted that when the predetermined length that is a threshold for determining the length of the vector FD or the length of the touch input path is changed and increased, the threshold L for maintaining the length of the touch input path formed between the reference coordinate point Rm and the current touch position coordinate point T may also be changed and increased (e.g., the threshold L may be increased by a factor of 1.5).

Figure 9:
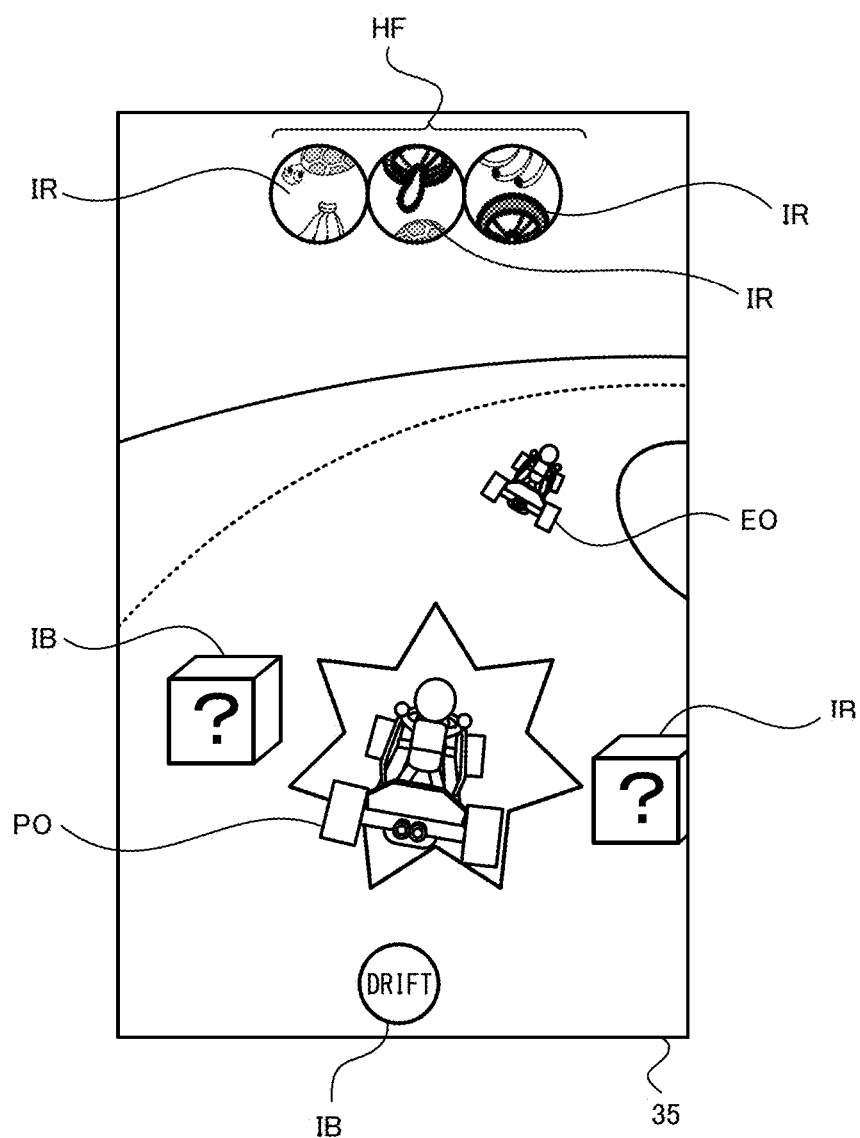
FIG. 9 is a diagram showing a non-limiting example game image displayed on the display unit 35 of the information processing apparatus 3 in a portrait-hold operation in the first mode.
Figure 10:
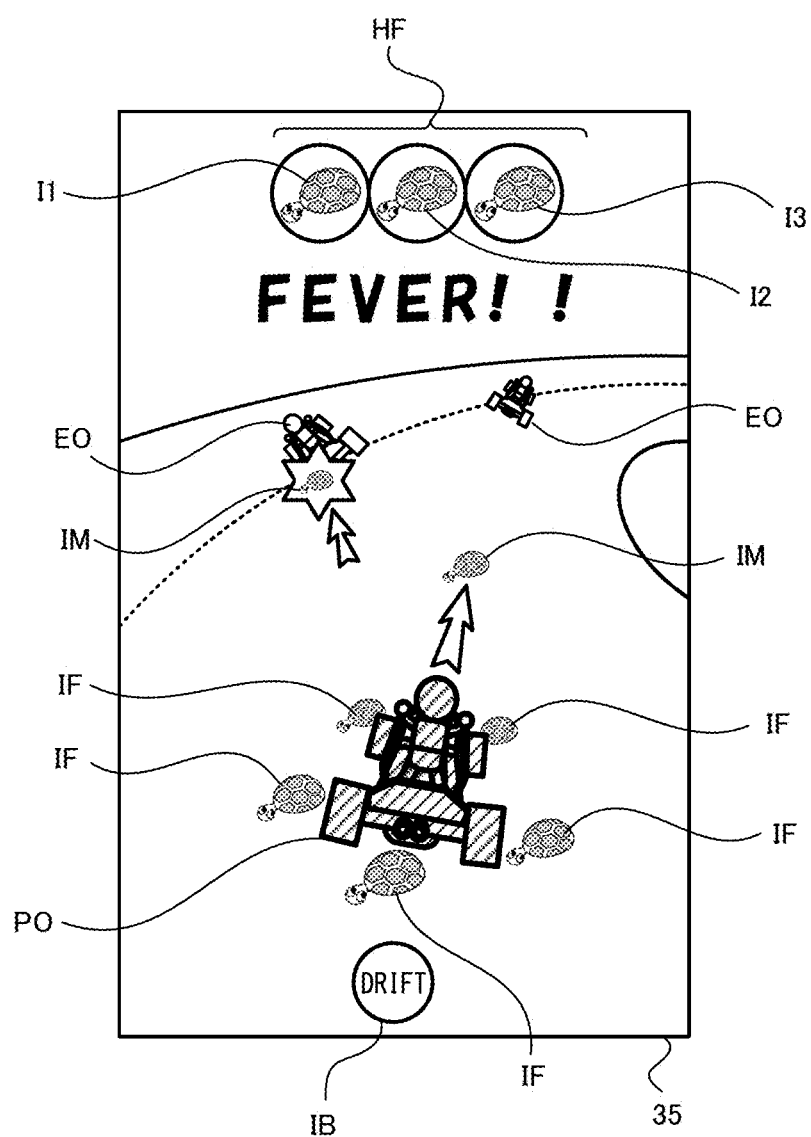
FIG. 10 is a diagram showing a non-limiting example game image displayed on the display unit 35 of the information processing apparatus 3 in a portrait-hold operation in the first mode.

Next, a non-limiting example of a first item lottery process performed in the information processing system 1 will be outlined with reference to FIGS. 9 and 10. In the non-limiting example first item lottery process, if items I (game objects) possessed by the player object PO satisfy a predetermined combinational condition, an effect relatively advantageous to progression of a game is given to the player object PO. It should be noted that FIG. 9 is a diagram showing a non-limiting example game image displayed on the display unit 35 of the information processing apparatus 3. FIG. 10 is a diagram showing a non-limiting example game image displayed on the display unit 35 of the information processing apparatus 3.

As in FIGS. 4 and 5, in FIG. 9, a game image corresponding to a game played in the information processing apparatus 3 is displayed on the display unit 35 of the information processing apparatus 3. As a non-limiting example, FIG. 10 shows a scene that the player object PO performs a racing game. For example, in the game, the player object PO is sitting on and driving a cart on a course provided in a virtual world, and can acquire a new item I by passing by or through an item box IB and thereby opening the item box IB placed on the course and thereby opening the item box IB. It should be noted that the player object PO can acquire a new item I only if there is a possession frame HF that is an empty frame E.

When the player object PO passes by or through an item box IB and thereby opens the item box IB, a lottery event for acquiring a new item I is performed. For example, FIG. 9 shows a non-limiting example in which in response to the player object PO passing by or through an item box IB, rotating display items IR indicating that a plurality of types of items I are successively displayed and a lottery is being performed are displayed, i.e., the rotation lottery display is being performed, in all the possession frames HF (three frames). It should be noted that the lottery for acquiring an item I is not performed for a possession frame HF in which an item I is already displayed. Specifically, when a possession frame HF that is an empty frame E and a possession frame HF that is displaying an item I coexist, the lottery is performed only for the empty frame E. When there is no possession frame HF that is an empty frame E, the lottery is not performed, and therefore, in this situation, the player object PO cannot acquire a new item I by the lottery. It should be noted that an item box IB may be placed at a specific position on the course, or may appear on the course at any suitable position as time passes.

Items I that are displayed in a stationary state in possession frames HF are finally acquired by the player object PO through a lottery. After the acquisition, the items I can be used by the player object PO one by one in a predetermined order (e.g., the order in which the items I have been acquired). By using an item I, the player object PO can obtain an effect advantageous to progression of a race.

As shown in FIG. 10, in the non-limiting example, if the same items I are finally displayed in all the possession frames HF in a lottery, the user wins a so-called "fever state" and can obtain an effect more advantageous to progression of a race performed by the player object PO. As a non-limiting example, when the player object PO is in the "fever state," an item that has caused the "fever state" can be continuously used for a predetermined fever period of time.

For example, in the non-limiting example of FIG. 10, the item I1 that is a carapace is displayed in a stationary state in the leftmost possession frame HF, the item I2 that is a carapace is displayed in a stationary state in the middle possession frame HF, and the item I3 that is a carapace is displayed in a stationary state in the rightmost possession frame HF, i.e., the same carapace item I is finally displayed in all the possession frames HF in a lottery. In this case, the "fever state" caused by carapace items is continued for a predetermined period of time, and an advantageous effect obtained by using a carapace item is given to the player object PO only during the predetermined fever period. For example, in the "fever state" caused by carapace items, a plurality of carapace items IF are disposed around the player object PO, indicating the "fever state" caused by carapace items to the user. When the user is performing a certain touch operation on the touch panel, a projectile carapace item IM is continually fired toward the front of the player object PO at predetermined intervals. Thus, while a single projectile carapace item IM can be fired from the player object PO when a carapace item I is used in a normal state, multiple projectile carapace items IM can be continually fired from the player object PO in the "fever state" caused by carapace items. In the "fever state," a projectile carapace item IM is continually fired at predetermined intervals without performing a swipe operation for firing the item. Therefore, an item can be repeatedly used while controlling the movement direction of the player object PO by a touch operation. Furthermore, while an item I can be used once for each possession frame HF in the normal state, i.e., the same number of items I as the possession frames HF (e.g., three) can be used, an indefinite number of items (i.e., greater than or equal to the number of possession frames HF, e.g., four or more) can be continually used without being limited to the number of possession frames HF during the fever period in which the "fever state" caused by the same three items I is continued. Therefore, the fever state is more advantageous to the user than in the normal state.

It should be noted that in the "fever state," the direction of the projectile item IM fired from the player object PO may be fixed to a predetermined direction (e.g., the direct forward direction of the player object PO), or may be fired in a random direction around the player object PO each time. When, in the "fever state," the vector FD satisfying the condition for firing the projectile item IM (i.e., the length of the vector FD is greater than or equal to a predetermined length and the direction of the vector FD is within the forward-direction determination region UA or the backward-direction determination region LA) is set, the projectile item IM may be fired based on the direction of the vector FD each time.

Thus, in the non-limiting example first item lottery process performed in the information processing system 1, at least one is selected from items I included in a plurality of possession frames and is used, and therefore, an in-game effect can be obtained based on the type of the selected item I, and a possession frame in which that item I is displayed is changed to an empty frame E after the occurrence of the in-game effect. In addition, when the condition that all items I included in the plurality of possession frames are the same item is satisfied in an item lottery, the above in-game effect can provide a more advantageous in-game effect.

It should be noted that in the non-limiting example, the player object PO can acquire a new item I only if there is a possession frame HF that is an empty frame E. Alternatively, even when there is no possession frame HF that is an empty frame E, a new item I may be able to be acquired. In this case, even when there is no possession frame HF that is an empty frame E, an item lottery can be performed, and the possession frames HF in which an item I is being displayed are put into the rotation lottery state. When an empty frame E and a frame in which an item I is being displayed coexist among the possession frames HF, not only the empty frame E but also the possession frame HF in which an item I is being displayed may be put into the rotation lottery state in an item lottery. When a possession frame HF in which an item I is being displayed is put into the rotation lottery state and an item lottery is performed, the possession frame HF may not be changed to an empty frame E after the item I is used.

Figure 11:
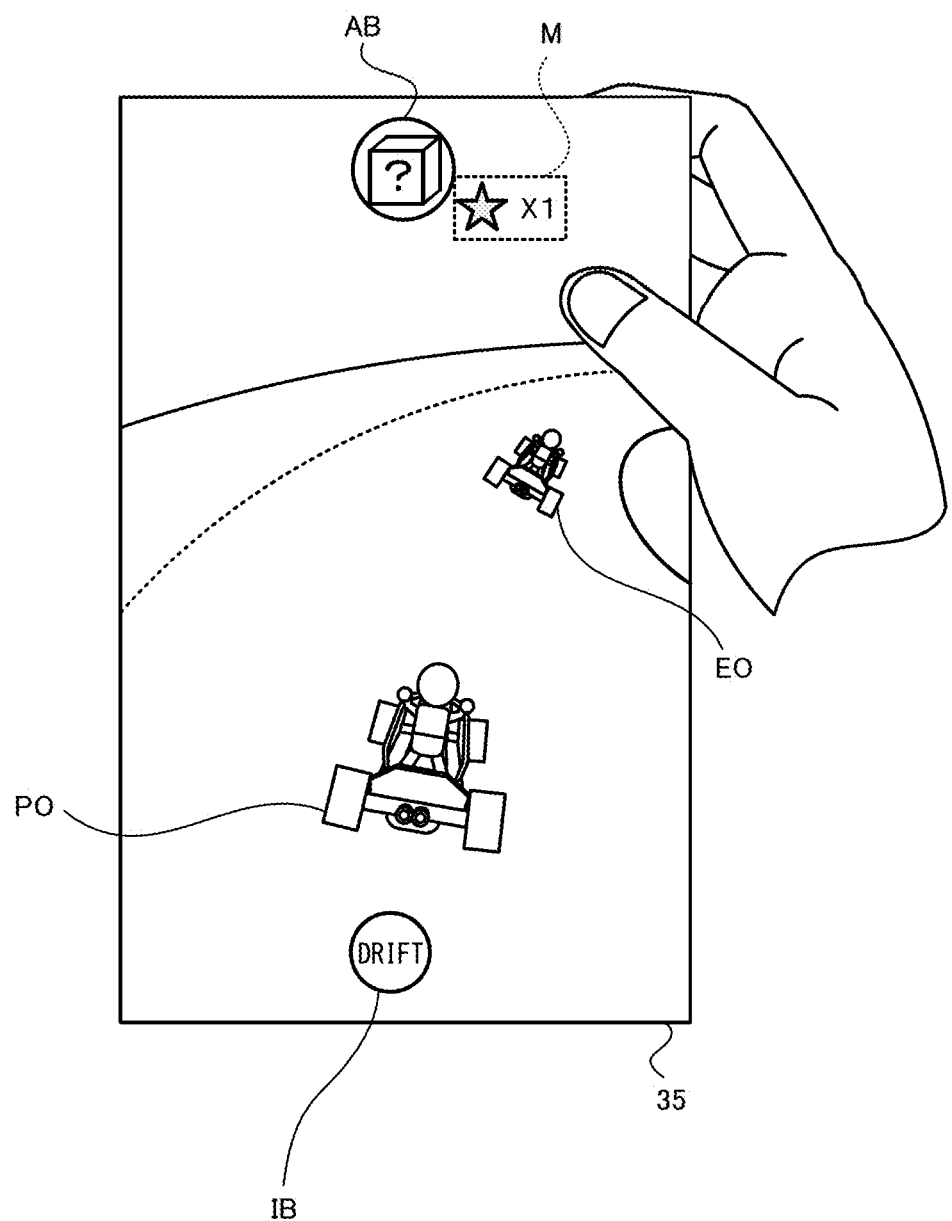
FIG. 11 is a diagram showing a non-limiting example game image displayed on the display unit 35 of the information processing apparatus 3 in a portrait-hold operation in the first mode.
Figure 12:
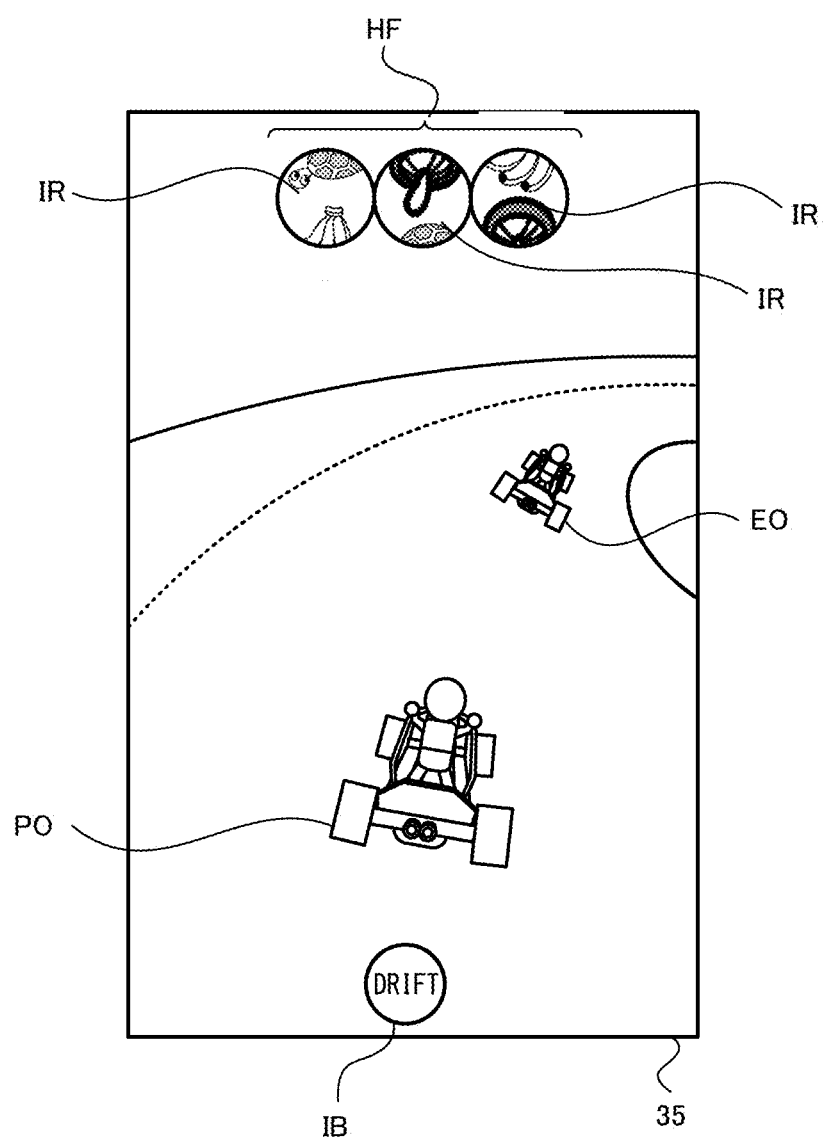
FIG. 12 is a diagram showing a non-limiting example game image displayed on the display unit 35 of the information processing apparatus 3 in a portrait-hold operation in the first mode.

Next, a non-limiting example of a second item lottery process that is performed in the information processing system 1 will be outlined with reference to FIGS. 11 and 12. In the non-limiting example second item lottery process, an item lottery can be performed without opening an item box IB provided in a race if a predetermined condition is satisfied. It should be noted that FIG. 11 is a diagram showing a non-limiting example game image displayed on the display unit 35 of the information processing apparatus 3. FIG. 12 is a diagram showing a non-limiting example game image displayed on the display unit 35 of the information processing apparatus 3.

Figure 15:
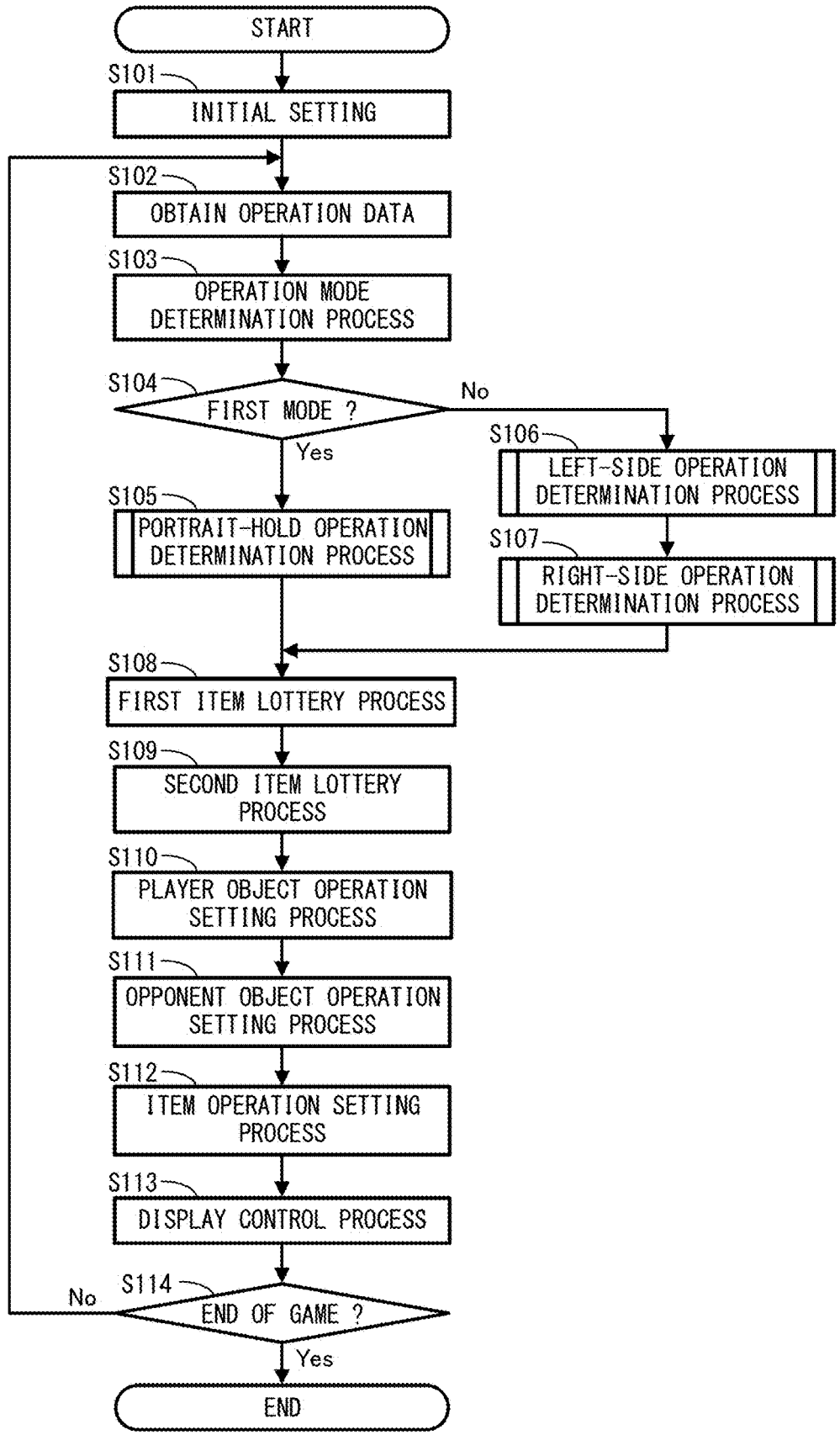
FIG. 15 is a flowchart showing a non-limiting example of a process executed in the information processing apparatus 3.

As in FIGS. 4 and 5, in FIG. 11, the display unit 35 of the information processing apparatus 3 displays a game image corresponding to a game played in the information processing apparatus 3. As a non-limiting example, FIG. 15 shows a scene in which the player object PO performs a racing game. For example, in the game, the player object PO is sitting on and driving a cart on a course provided in a virtual world. If a predetermined condition is satisfied when the player object PO is traveling, an item lottery icon AB appears instead of the possession frames HF.

The item lottery icon AB functions as an operation instruction button that is selected and executed by the user's touch operation, and is displayed at or near the center of an upper portion of the display screen when the display unit 35 is being held in portrait position. Money amount information M that indicates the amount of virtual money that is consumed when the item lottery icon AB is selected and executed is provided near the item lottery icon AB. In the non-limiting example of FIG. 15, the money amount information M indicates that when the item lottery icon AB is used, a piece of star-shaped virtual money that can be acquired by the user by payment is consumed. It should be noted that the item lottery icon AB and the money amount information M appear if all the possession frames HF are an empty frame E, and do not appear if the number of times of use exceeds a limit (e.g., once a race) due to consumption or if the user does not have enough virtual money to use the item lottery icon AB. For example, when the item lottery icon AB is used by a touch operation (e.g., a tap operation) on the item lottery icon AB displayed on the touch panel, an item lottery event for acquiring a new item I is started. In other words, the item lottery icon AB is an operation button that receives the user's instruction to perform a lottery event for newly acquiring an item I, and an image that is used by the user to give an instruction to perform control related to control of an action of firing an item I that is performed based on the upward/downward component in the display screen of a swipe input to the touch panel. It should be noted that the state in which the item lottery icon AB does not appear may be such that the item lottery icon AB is not displayed on the display screen, or such that the item lottery icon AB may be displayed grayed-out or translucent. Even in a state in which the item lottery icon AB is not allowed to be selected, the item lottery icon AB may be displayed on the display screen. In this case, even when the user performs an operation of selecting the item lottery icon AB, the item lottery icon AB provokes no response. It should be noted that the item lottery icon AB corresponds to a non-limiting example of an image for giving an instruction to perform control related to a second control.

As shown in FIG. 12, when the item lottery icon AB is used, the possession frames HF appear instead of the item lottery icon AB and the money amount information M. As in the non-limiting example first item lottery process, a rotating display item IR indicating the rotation lottery display state is displayed in all the possession frames HF, and thereafter, an item I is displayed in a stationary state in each frame, indicating that the items I finally displayed in a stationary state have been acquired in a lottery.

Even in an item lottery triggered by using the item lottery icon AB, items I that are displayed in a stationary state in possession frames HF are finally acquired by the player object PO through the lottery, and after the acquisition, the player object PO can use the acquired items one by one in a predetermined order using the above operation method. The player object PO can obtain an advantageous effect to progression of the game using the items I.

Even in an item lottery triggered by using the item lottery icon AB, when the same item I is finally displayed in all the possession frames HF through the lottery, the "fever state" is won and the player object PO can obtain a more advantageous effect to progression of a race. As in the non-limiting example first item lottery process, when the player object PO wins the "fever state," an item causing the "fever state" can be continually used only during a predetermined fever period.

Thus, in an item lottery triggered by using the item lottery icon AB, a new item I can be acquired or the "fever state" can be won, as in an item lottery triggered by opening an item box IB provided on the course. Therefore, the user can start a new item lottery whenever the item lottery icon AB appears, in addition to the situation where an item box IB is placed on the course. It should be noted that an item lottery triggered by using the item lottery icon AB and an item lottery triggered by opening an item box IB may include more elements different therebetween.

As a first non-limiting example, a period of time for which an item lottery triggered by using the item lottery icon AB is performed (a rotation lottery event of an item I is performed) may be set shorter than a period of time for which an item lottery triggered by opening an item box IB is performed. As a result, when the item lottery icon AB is used, the time it takes for the player object PO to obtain an effect provided by acquiring a new item I or winning the "fever state" can be reduced, and as a result, the player object PO can obtain an advantageous effect earlier.

As a second non-limiting example, the probability of winning an item lottery triggered by using the item lottery icon AB to get the "fever state" may be set higher than the probability of winning an item lottery triggered by opening an item box IB to get the "fever state." As a result, when the item lottery icon AB is used, the probability that the player object PO obtains an effect provided by the "fever state" is increased, and therefore, the possibility that the player object PO can obtain an advantageous effect is increased. It should be noted that the magnitude of an increase in the probability of winning the "fever state" may be changed, depending on the amount of virtual money consumed when the item lottery icon AB is selected and executed. As a non-limiting example, as the amount of virtual money consumed when the item lottery icon AB is selected and executed increases, the probability may be increased. In this case, as the number of times of selection and execution of the item lottery icon AB in a race increases, the amount of virtual money consumed by the execution may be increased, and the probability may be increased with an increase in the consumed virtual money amount. Compared to when an item lottery triggered by opening an item box IB is won to get the "fever state," the probability of winning using an item having a higher effect may be increased when an item lottery triggered by using the item lottery icon AB is won to get the "fever state."

In the above non-limiting example game, when the item lottery icon AB is selected and executed, star-shaped virtual money is consumed. Alternatively, in-game coins that can be exchanged for star-shaped virtual money in the purchase screen may be consumed upon the execution. Thus, even in the case where in-game coins are consumed when the item lottery icon AB is selected and executed, after star-shaped virtual money is once exchanged for in-game coins, the item lottery icon AB can be executed using the in-game coins. Therefore, it can be said that star-shaped virtual money can be used to execute the item lottery icon AB.

It should be noted that in the above non-limiting example, only when all the possession frames HF are an empty frame E, the item lottery icon AB appears. Alternatively, the item lottery icon AB may appear even when none of the possession frames HF is an empty frame E or when a portion of the possession frames HF are an empty frame E. In this case, even when none of the possession frames HF is an empty frame E or when a portion of the possession frames HF are an empty frame E, an item lottery can be triggered by selecting the item lottery icon AB, and a possession frame HF in which an item I is being displayed is also put into the rotation lottery state. When an item lottery is performed by selecting the item lottery icon AB in a situation that an empty frame E and a frame in which an item I is being displayed coexist among the possession frames HF, the empty frame E as well as the possession frame HF in which an item I is being displayed may be put into the rotation lottery state.

In the above description, when the player object PO comes into contact with an item box IB disposed on the course in a race, the player object PO can obtain a temporary effect that is effective in that race by the use of an item I. Alternatively, the temporary effect may be obtained without such a contact with an item box IB. For example, instead of a lottery event for a new item I that is triggered when the player object PO comes into contact with an item box IB, a lottery event for a new item I may be automatically performed at predetermined intervals. In this case, by selecting the item lottery icon AB, a new item I may be allowed to be acquired through a lottery even during the predetermined interval.

The number of possession frames HF may be changed, depending on the type of the player object PO. As a non-limiting example, the number of possession frames HF may be changed, depending on a relationship between the player object PO and a course on which the player object PO travels. Three possession frames HF may be displayed for a course having a good relationship with the player object PO, and one possession frame HF may be displayed for a course having a bad relationship with the player object PO. When a gameplay is performed using a course for which a single possession frame HF is displayed, the player object PO can simultaneously have a smaller number of items I, and the "fever state" caused by all the possession frames HF having the same item I does not occur, and therefore, the user is in a disadvantageous condition. It should be noted that even in the case where a course has a bad relationship and a single possession frame HF is displayed, three possession frames HF may appear and a lottery event may be performed for new items I when the item lottery icon AB is selected. In the case where the number of displayed possession frames HF is thus changed, depending on the relationship between the player object PO and a course, the user is motivated to select the type of a player object PO to be used.

Figure 13:
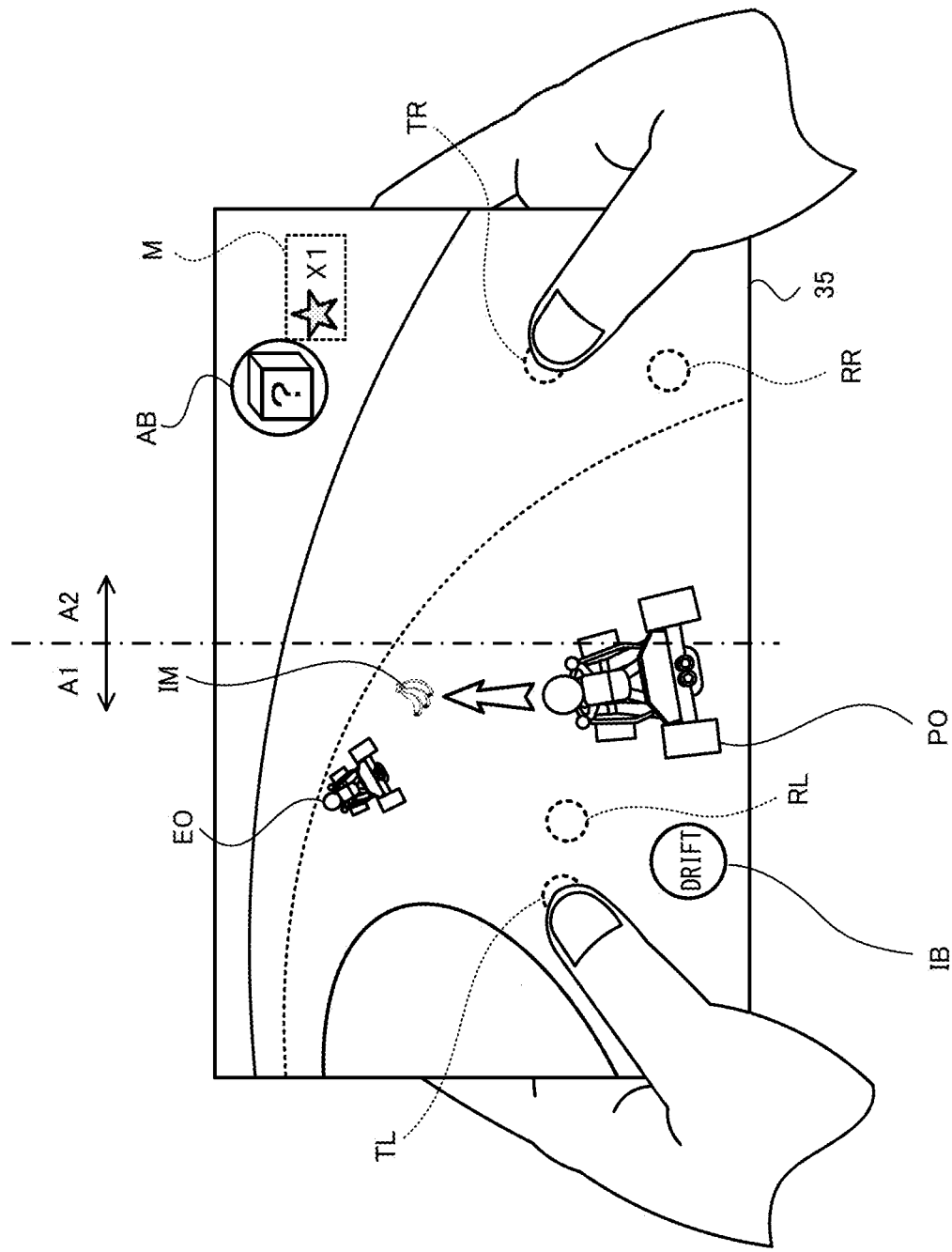
FIG. 13 is a diagram showing a non-limiting example game image displayed on the display unit 35 of the information processing apparatus 3 in a landscape-held operation in a second mode.

Next, a non-limiting example in which an operation is performed on the display unit 35 in a second mode with the display unit 35 held in landscape position will be described with reference to FIG. 13. It should be noted that FIG. 13 is a diagram showing a non-limiting example game image displayed on the display unit 35 of the information processing apparatus 3 during the landscape-hold operation in the second mode.

As in the portrait-hold operation, the display unit 35 of the information processing apparatus 3 being held in landscape position also displays a game image corresponding to a game that is played in the information processing apparatus 3. As a non-limiting example of such a game image, a scene in which the player object PO performs a racing game is displayed. Here, when the user changes the display unit 35 from portrait position to landscape position, the angle of view and distance from the gaze point of the virtual camera for displaying a game image on the display unit 35 are changed to those for the landscape screen (an angle of view suitable for the aspect ratio of the display screen in landscape position, and a distance suitable for the display size of landscape display), depending on the orientation of the display unit 35 with respect to the direction of gravity in real space. It should be noted that when it is determined based on the orientation of the display unit 35 with respect to the direction of gravity in real space that the display unit 35 is being held in landscape position, the display direction of an image displayed on the display unit 35 is changed such that the upward/downward direction of a game image captured by the virtual camera corresponds to the shorter-axis direction of the display unit 35, and the downward direction of the game image is closer to the direction of gravity acting on the display unit 35 than is the upward direction of the game image.

For example, in this non-limiting example, it is determined whether the information processing apparatus 3 (the display unit 35) is being held in portrait position or in landscape position, based on a gravitational acceleration acting on the information processing apparatus 3 (the display unit 35). Here, the information processing apparatus 3, which includes an inertial sensor (an acceleration sensor and/or an angular velocity sensor) as described above, can calculate the direction of the gravitational acceleration acting on the information processing apparatus 3 (the display unit 35) using any appropriate technique based on a result of detection by the inertial sensor (accelerations along three axial directions detected by the acceleration sensor and/or angular velocities about three axes detected by the angular velocity sensor). For example, if the direction of the gravitational acceleration acting on the display unit 35 is closer to the longer-axis direction than to the shorter-axis direction of the display unit 35, it is determined that the information processing apparatus 3 (the display unit 35) is being held in portrait position. If the direction of the gravitational acceleration acting on the display unit 35 is closer to the shorter-axis direction than to the longer-axis direction of the display unit 35, it is determined that the information processing apparatus 3 (the display unit 35) is being held in landscape position.

When the orientation of the information processing apparatus 3 (the display unit 35) is changed from portrait position to landscape position, or from landscape position to portrait position, the angle of view and distance from the gaze point of the virtual camera in the virtual space are changed to those for the landscape screen, depending on the changed direction. For example, when the information processing apparatus 3 (the display unit 35) is being held in portrait position, the angle of view and distance from the gaze point of the display unit 35 are set to those for the portrait screen (an angle of view suitable for the aspect ratio of the display screen in portrait position, and a distance suitable for the display size of portrait display). The display direction of an image displayed on the display unit 35 is set based on the orientation of the display unit 35 with respect to the direction of gravity in real space such that the upward/downward direction of a game image captured by the virtual camera is the longer-axis direction of the display unit 35, and the downward direction of the game image is closer to the direction of gravity acting on the display unit 35 than is the upward direction. When the display unit 35 is changed from portrait position to landscape position by being turned clockwise about the depth direction of the display screen by 90° (roll rotation), the angle of view and distance from the gaze point of the virtual camera are changed to those for the landscape screen. As a result, when the information processing apparatus 3 (the display unit 35) is being held in landscape position, the display direction of a game image is set such that the shorter-axis direction of the display unit 35 is the upward/downward direction of the virtual space (more specifically, the shorter-axis direction of the display unit 35, which is the downward direction in real space, is the direction of gravity in the virtual space).

As shown in FIG. 13, in the case of the second mode in which the display unit 35 is operated in landscape position, a first region A1 and a second region A2, which do not overlap, are set in the touch region of the touch panel provided in the display unit 35. Specifically, the first region A1 is set in a touch region covering a left half of the display screen of the display unit 35 being held in landscape position. The second region A2 is set in a touch region covering a right half of the display screen of the display unit 35 being held in landscape position. The first region A1 and the second region A2 are adjacent to each other with a middle of the display screen interposed therebetween. In the second mode, the movement direction of the player object PO can be controlled by performing a touch operation in the first region A1. Also, in the second mode, an action of the player object PO firing a possessed item I can be controlled by performing a touch operation on the second region A2.

It should be noted that the touch region of the touch panel provided in the display unit 35 may include a touch operation ineffective region in which neither the movement direction of the player object PO nor the action of firing an item I is controlled. As a non-limiting example, in both of the first mode in which the display unit 35 is operated in portrait position and the second mode in which the display unit 35 is operated in landscape position, a predetermined upper region in the touch region of display screen (e.g., an uppermost portion of the touch region of the display screen that accounts for 17.5% of the display screen) may be set to the touch operation ineffective region, and when a touch position caused by a swipe operation enters the touch operation ineffective region, the swipe operation may be made ineffective so that neither the movement direction of the player object PO nor the action of firing an item I is controlled by that swipe operation. Thus, in both of the operation modes, by providing a touch operation ineffective region in an upper touch region of the display screen, the user can be prompted to perform a touch operation using a lower touch region of the display screen, which is easy for the user to perform an operation. It should be noted that when a touch operation is performed in the touch operation ineffective region, game controls other than the control of the movement direction of the player object PO and the action of firing an item I may be executed.

When a touch operation of swiping rightward in the first region A1 is performed with reference to a left-side reference coordinate point (e.g., a left-side reference coordinate point RL0 where the first region A1 is first touched) set in the first region A1 of the display unit 35 being held in landscape position, the player object PO changes the movement direction to a rightward direction. When a touch operation of swiping leftward in the first region A1 is performed with reference to the left-side reference coordinate point set in the first region A1 of the display unit 35 being held in landscape position, the player object PO changes the movement direction to a leftward direction. For example, FIG. 13 shows a left reference position RL indicating the left-side reference coordinate point set in the first region A1, and a left-side touch position TL indicating the current touch position in the first region A1 (actually, no images of the left reference position and the current left-side touch position are displayed on the display unit 35, and in FIG. 13, the left reference position RL indicating the left reference position and the left-side touch position TL indicating the left-side touch position are each indicated by a dashed line for the sake of convenience). The left-side touch position TL is disposed to the left of the left reference position RL, and therefore, the player object PO changes the movement direction to a leftward direction. It should be noted that in the second mode, even when a touch operation of swiping the upward/downward direction of the display unit 35 in the first region A1 with reference to the left-side reference coordinate point in the first region A1, an action of firing an item I is not performed. Specifically, even if a swipe input to the first region A1 of the display unit 35 being held in landscape position includes an upward/downward component, control of an action of firing an item I is not performed, and the first region A1 serves as a region dedicated to a touch operation for changing the movement direction of the player object PO according to a touch operation.

In the case of the display unit 35 being held in landscape position, a mode change button IB for giving an instruction to perform control related to movement of the player object PO is also displayed in the first region A1. Here, as in the first mode, the mode change button IB is an image indicating a touch region for selecting a movement (travel) mode of the player object PO corresponding to the touch operation of swiping. The mode change button IB in the second mode is displayed at or near the center of a lower portion of the first region A1 of the display unit 35 being held in landscape position, and a circular region used for a touch operation in the first region A1 is displayed at the position of the mode change button IB, and a selectable travel mode (in the example of FIG. 13, "drift") is displayed in the circular region. Thus, the mode change button IB in the second mode is moved to and displayed in the first region A1, compared to the first mode. When an operation of first touching and swiping is performed inside the circular region indicated by the mode change button IB, the player object PO changes the movement direction to the swipe direction in a travel mode specified by the mode change button IB as in the first mode. When an operation of first touching and swiping is performed outside the circular region indicated by the mode change button IB, the player object PO changes the movement direction to the swipe direction in a travel mode different from that specified by the mode change button IB. It should be noted that in the second mode, the travel mode that can be specified using the mode change button IB may also be previously specified by the user's operation. In the second mode, a plurality of mode change buttons IB indicating different travel modes may also be displayed in the first region A1.

It should be noted that a method and process of changing the movement direction of the player object PO when a swipe input to the first region A1 of the display unit 35 being held in landscape position is performed leftward or rightward are similar to those of the first mode as long as a touch operation is performed in the first region A1, and therefore, will not be described in detail. As with the reference coordinate point R0 in the first mode, the left-side reference coordinate point RL0 is set at a position where the first region A1 is first touched. As with the reference coordinate point Rm that is set based on (e.g., following) the current touch position coordinate point T in the first mode, a left-side reference coordinate point RLm is set, following the left-side touch position coordinate point TL in the first region A1. The left-side reference coordinate point RL0 and the left-side reference coordinate point RLm are set in the first region A1 in a manner similar to that for the reference coordinate point R0 and the reference coordinate point Rm set in the first mode, and therefore, will not be described in detail.

Here, in the second mode, because the display unit 35 is turned by 90° roll rotation, the magnitude of the leftward/rightward component in the display screen of a swipe input to the first region A1 of the display unit 35 being held in landscape position, which is calculated for a steering operation, is the magnitude of a second-axis (longer-axis) direction component of the difference between the left-side reference coordinate point set in the first region A1 (e.g., the left-side reference coordinate point RL0 where the first region A1 is first touched), and the current left-side touch position coordinate point TL in a swipe operation performed, continuously following the initial touch. It should be noted that in the second mode, the left-side reference coordinate point for calculating the magnitude of the leftward/rightward component may also be the left-side reference coordinate point RLm that is moved, following the current left-side touch position coordinate point TL. In that case, the magnitude of the leftward/rightward component of a swipe input to the first region A1 is the magnitude of a second-axis (longer-axis) direction component of the difference between the left-side reference coordinate point RLm that is moved, following the current left-side touch position coordinate point TL, and the current left-side touch position coordinate point TL in a swipe operation performed, continuously following the initial touch.

In the second mode, an action of the player object PO firing a possessed item I can be controlled by performing a touch operation in the second region A2 of the display unit 35 being held in landscape position. For example, when a touch operation of swiping upward is performed in the second region A2 of the display unit 35 being held in landscape position, then if a ready-to-use item IP disposed at the ready-to-use position of the player object PO is fireable, the item IP is fired as a projectile item IM toward the front of the player object PO. Some types of ready-to-use items IP (e.g., a banana item) disposed at the ready-to-use position may be fired as a projectile item IM toward the back of the player object PO when a touch operation of swiping downward is performed in the second region A2 of the display unit 35 being held in landscape position.

An action of firing an item I is controlled according to the upward/downward component in the display screen of a swipe input to the second region A2 of the display unit 35 being held in landscape position with reference to a right-side reference coordinate point set in the second region A2. For example, FIG. 13 shows a right reference position RR indicating the right-side reference coordinate point set in the second region A2, and a right-side touch position TR indicating the current touch position in the second region A2 (actually, no images of the right reference position and the current right-side touch position are displayed on the display unit 35, and in FIG. 13, the right reference position RR indicating the right reference position and the right-side touch position TR indicating the right-side touch position are each indicated by a dashed line for the sake of convenience). Because the right-side touch position TR is disposed above the right reference position RR by performing a swipe operation upward with respect to the right reference position RR, a projectile item IM is fired toward the front of the player object PO. It should be noted that in the second mode, even when a touch operation of swiping in the second region A2 in the leftward/rightward direction of the display unit 35 with reference to the right-side reference coordinate point in the second region A2, the movement direction of the player object PO is not controlled. Thus, even when a swipe input to the second region A2 of the display unit 35 being held in landscape position includes a leftward/rightward component, the movement direction of the player object PO is not controlled. The second region A2 serves as a touch operation-only region for controlling the action of firing an item I according to a touch operation.

The display unit 35 being held in landscape position also displays, in the second region A2, an item lottery icon AB for giving an instruction to perform control related to control of an action of firing an item I. Here, the item lottery icon AB is an operation button that receives the user's instruction to perform a lottery event for newly acquiring an item I as in the first mode. In the second mode, the item lottery icon AB is displayed at or near the center of an upper portion of the second region A2 with the display unit 35 held in landscape position. Specifically, the item lottery icon AB in the second mode is moved to and displayed in the second region A2, compared to the first mode. When an operation of selecting the item lottery icon AB is performed, the possession frames HF appear instead of the item lottery icon AB and the money amount information M. A rotating display item IR indicating the rotation lottery display state is displayed in all the possession frames HF, and thereafter, an item I is displayed in a stationary state in each frame, indicating that the items I finally displayed in a stationary state have been acquired in a lottery.

It should be noted that in the second mode, the item lottery method and the method of using items are similar to those in the first mode, and therefore, will not be described in detail. The method and process of firing an item I performed when an upward/downward swipe input to the second region A2 of the display unit 35 being held in landscape position is performed, are similar to those in the first mode as long as a touch operation is performed in the second region A2, and therefore, will not be described in detail. As with the reference coordinate point R0 in the first mode, a right-side reference coordinate point RR0 is set at a position where the second region A2 is first touched. As with the reference coordinate point Rm set based on (e.g., following) the current touch position coordinate point T in the first mode, a right-side reference coordinate point RRm is set, following the right-side touch position coordinate point TR in the second region A2. The right-side reference coordinate point RR0 and the right-side reference coordinate point RRm set in the second region A2 are set in a manner similar to that for the reference coordinate point R0 and the reference coordinate point Rm set in the first mode, and therefore, will not be described in detail.

Here, in the second mode, because the display unit 35 is turned by 90° roll rotation, the upward/downward component in the display screen of a swipe input to the second region A2 of the display unit 35 being held in landscape position, which is calculated for control of firing of an item I, is a first-axis (shorter-axis) direction component of the difference between the right-side reference coordinate point component set in the second region A2 (e.g., the right-side reference coordinate point RRm that is moved, following the current right-side touch position coordinate point TR), and the current right-side touch position coordinate point TR in a swipe operation performed, continuously following the initial touch. It should be noted that in the second mode, the right-side reference coordinate point for calculating the upward/downward component may be the right-side reference coordinate point RR0 where the second region A2 is first touched. In that case, the upward/downward component of a swipe input to the second region A2 is a first-axis (shorter-axis) direction component of the difference between the right-side reference coordinate point RR0 where the second region A2 is first touched, and the current right-side touch position coordinate point TR in a swipe operation performed, continuously following the initial touch.

In the second mode, the control of the movement direction of the player object PO and the control of firing of an item I can be performed in parallel. Specifically, in the second mode, the control of firing of an item I can be performed based on a touch operation using the second region A2 of the display unit 35 being held in landscape position while the control of the movement direction of the player object PO is performed based on a touch operation using the first region A1. Therefore, the user can cause a plurality of controls to simultaneously proceed while performing a multi-touch operation using fingers of the left and right hands.

It should be noted that when in the second mode, a swipe operation is performed across a border between the first region A1 and the second region A2, i.e., moved from one of the first region A1 and the second region A2 to the other, control using a touch operation in the one region is changed to control using a touch operation in the other region.

For example, if, when the control of the movement direction of the player object PO is being performed according to a swipe operation in the first region A1, the touch coordinate point of the swipe operation enters the second region A2, various types of touch coordinate data (the left-side reference coordinate data, the current left-side touch input coordinate data, the left-side touch history data, etc.) set in the first region A1 are cleared, and the control of the movement direction of the player object PO is changed to the control of firing of an item I using the swipe operation entering the second region A2. As a non-limiting example, if, when a touch operation is not being performed in the second region A2, a swipe operation entering from the first region A1 into the second region A2 is performed, the control of the movement direction of the player object PO is changed to the control of firing of an item I using the swipe operation entering the second region A2, in which in turn, the right-side reference coordinate point RR0 is newly set at a position where the second region A2 has entered, and an upward/downward component between a most recent touch input coordinate point TR in the second region A2 and the right-side reference coordinate point RR0 or the right-side reference coordinate point RRm is used. As another non-limiting example, if, when a touch operation is being performed in the second region A2, a swipe operation entering from the first region A1 into the second region A2 is performed, so that there are two touch input coordinate points that are detected in the second region A2, the coordinate point that is a middle point between the two touch input coordinate points is set as the most recent right-side touch input coordinate point TR, and an upward/downward component between the most recent right-side touch input coordinate point TR and the right-side reference coordinate point RR0 or the right-side reference coordinate point RRm set in the second region A2 is used in the control of firing of an item I using the swipe operation entering the second region A2.

If, when the control of firing of an item I is being performed according to a swipe operation in the second region A2, the touch coordinate point of the swipe operation enters the first region A1, various types of touch coordinate data (the right-side reference coordinate data, the current right-side touch input coordinate data, the right-side touch history data, etc.) set in the second region A2 are cleared, and the control of firing of an item I is changed to the control of the movement direction of the player object PO using the swipe operation entering the first region A1. As a non-limiting example, if, when a touch operation is not being performed in the first region A1, a swipe operation entering from the second region A2 into the first region A1 is performed, the control of firing of an item I is changed to the control of the movement direction of the player object PO using the swipe operation entering the first region A1, in which in turn, a left-side reference coordinate point RL0 is newly set at a position where the swipe operation has entered the first region A1, and a leftward/rightward component between the most recent touch input coordinate point TL in the first region A1 and the left-side reference coordinate point RL0 or the left-side reference coordinate point RLm is used. As a non-limiting example, if, when a touch operation is being performed in the first region A1, a swipe operation entering from the second region A2 into the first region A1 is performed, so that there are two touch input coordinate points that are detected in the first region A1, the coordinate point that is a middle point between the two touch input coordinate points is set as the most recent left-side touch input coordinate point TL, and a leftward/rightward component between the most recent left-side touch input coordinate point TL and the left-side reference coordinate point RL0 or the left-side reference coordinate point RLm set in the first region A1 is used in the control of the movement direction of the player object PO using the swipe operation entering the first region A1.

Although in the above description, when a swipe operation enters from one region into another region, various types of touch coordinate data set in the region where the swipe operation has been previously performed are cleared, the various types of touch coordinate data may not be cleared. For example, in some travel modes selected by a swipe operation (e.g., the player object PO is being drifting), when the touch coordinate point enters the second region A2 due to the swipe operation, the control of firing of an item I may be performed according to the swipe operation entering the second region A2 while the various types of touch coordinate data (the left-side reference coordinate data, the current left-side touch input coordinate data, the left-side touch history data, etc.) set in the first region A1 are maintained while the traveling of the player object PO in that travel mode is continued with the leftward/rightward component caused by the swipe operation set to zero. In that case, when the swipe operation returns to a touch input to the first region A1, the control of the movement direction of the player object PO is performed again using the various types of touch coordinate data maintained in the first region A1.

Here, the first region A1 and the second region A2 set in the display unit 35 being held in landscape position are arranged side by side laterally (the longer-axis direction of the display unit 35). The leftward/rightward component (component in the longer-axis direction of the display unit 35) of a swipe operation performed in the first region A1 is used in the control of the movement direction of the player object PO, and the upward/downward component thereof is not used in the control of the movement direction of the player object PO (e.g., steering wheel control, drift control, etc.). The upward/downward component (component in the shorter-axis direction of the display unit 35) of a swipe operation performed in the second region A2 is used in the control of firing of an item I, and the leftward/rightward component thereof is not used in game control. Therefore, when the user, who intends to perform game control using the leftward/rightward component of a swipe operation in the first region A1, mistakenly starts a swipe operation in the second region A2 which is not intended by the user, it is thought that the swipe operation in the second region A2 which is not intended by the user corresponds to a swipe operation toward the first region A1 that generates a leftward/rightward component, and therefore, the control of firing of an item I is not performed by that swipe operation in the second region A2. Therefore, the game control by the swipe operation can be immediately changed to that which is intended by the user, and an operation object that is being changed is not changed to another operation object during the swipe operation, and therefore, it is possible to prevent confusion from occurring in operation results. If the user, who intends to perform game control using the upward/downward component of a swipe operation in the second region A2, mistakenly starts a swipe operation in the first region A1 which is not intended by the user, the user can understand that the game control using the upward/downward component uses the second region A2, and therefore, even when a touch operation is started in the first region A1 on the left side of and not very far away from the center of the display screen, it is thought that the touch position is moved into the second region A2 on the right side, and at that time, the controls to be performed are changed, so that the control using the second region A2 can be subsequently performed without continuing the control using the first region A1.

Concerning the changing of the operation modes, in the control of the movement direction of the player object PO in the first mode used in the portrait-hold operation of the display unit 35, the first-axis (shorter-axis) direction component of the display unit 35 is used as the leftward/rightward component of a swipe input to the first region A1. In the control of firing of an item I in the second mode used in the landscape-hold operation of the display unit 35, the first-axis (shorter-axis) direction component of the display unit 35 is used as the upward/downward component of a swipe input in the second region A2. Thus, the axis used as the leftward/rightward component of the portrait-hold operation of the display unit 35 is the same as the axis used as the upward/downward component of the landscape-hold operation of the display unit 35. Alternatively, these axes may be different. Also, concerning the changing of the operation modes, in the control of firing of an item I in the first mode used in the portrait-hold operation of the display unit 35, the second-axis (longer-axis) direction component of the display unit 35 is used as the upward/downward component of a swipe input in the second region A2. In the control of the movement direction of the player object PO in the second mode used in the landscape-hold operation of the display unit 35, the second-axis (longer-axis) direction component of the display unit 35 is used as the leftward/rightward component of a swipe input to the first region A1. Thus, the axis used as the upward/downward component of the portrait-hold operation of the display unit 35 is the same as the leftward/rightward component of the landscape-hold operation of the display unit 35. Alternatively, these axes may be different.

In the above non-limiting examples, operation modes are changed, depending on the orientation of the information processing apparatus 3 (the display unit 35) in real space. Operation modes may be changed in other manners. As a non-limiting example, operation modes may be changed by the user selecting one from options indicating a plurality of operation modes. As another non-limiting example, operation modes may be changed, depending on the number of touch operations on the touch panel. As a non-limiting example, when the number of touch operations on the touch panel is one, the first mode may be selected, and when the number of touch operations on the touch panel is two, the second mode may be selected.

An image for guiding the swipe operation may be displayed on the display unit 35. In that case, a guide image may be displayed at a display position depending on a selected operation mode. For example, in the first mode in which the display unit 35 is operated in portrait position, an image for guiding the user to change the movement direction of the player object PO by performing a swipe operation leftward or rightward, and an image for guiding the user to fire an item I by performing a swipe operation upward or downward, may be displayed at or near the center of a lower portion of the display screen. In the second mode in which the display unit 35 is operated in landscape position, an image for guiding the user to change the movement direction of the player object PO by performing a swipe operation leftward or rightward may be displayed at or near the center of a lower portion of the first region A1, and an image for guiding the user to fire an item I by performing a swipe operation upward or downward may be displayed at or near the center of a lower portion of the second region A2.

A gap that is not included in the first region A1 or the second region A2 of the touch region may be provided therebetween. In that case, when a touch operation caused by a swipe operation in the first region A1 or the second region A2 enters the gap, various types of touch coordinate data (the reference coordinate data, the current touch input coordinate data, the touch history data, etc.) set in the first region A1 or the second region A2 may be cleared, and the control process by the swipe operation may be canceled. When a swipe operation entering from the gap into the first region A1 or the second region A2 is performed, a control process may be started using the region which the swipe operation has entered, using the position where the swipe operation has entered, as a reference position.

Although in the above non-limiting example, a game process is performed using the leftward/rightward component or upward/downward component of a swipe operation, other touch operation schemes may be used. For example, when touch is temporarily released from the touch panel during a swipe operation, then if the touch operation is performed in the same region, the swipe operation may be dealt with as a single swipe operation, to which the above process may be applied. In that case, various types of touch coordinate data (the reference coordinate data, the current touch input coordinate data, the touch history data, etc.) set in the first region A1 or the second region A2 may be maintained for a predetermined period of time even if touch is released from the touch panel, and when the touch panel is first touched again, that touch coordinate data may be used.

Although in the above non-limiting example, the movement direction of the player object PO is controlled according to the leftward/rightward component of a swipe operation, the movement direction of the player object PO may be able to be controlled by other operations in both of the first mode and the second mode. For example, the movement direction of the player object PO may be changed between the leftward direction and the rightward direction, depending on an operation of rolling the entire information processing apparatus 3 (display unit 35) clockwise or anticlockwise about the display screen depth direction. Such an operation of changing the orientation of the entire information processing apparatus 3 (display unit 35) can be detected by calculating the orientation of the entire information processing apparatus 3 (display unit 35) with reference to the direction of gravity in real space using an output of the inertial sensor 37, and the movement direction of the player object PO can be controlled according to the angle of roll with reference to the direction of gravity.

Although in the above example, the two touch regions (the first region A1 and the second region A2) are set by dividing the entire touch region of the display unit 35 being held in landscape position into a left region and a right region, two touch regions may be set by dividing the entire touch region into an upper region and a lower region. For example, an upper half region of the entire touch region of the display unit 35 may be set as a region in which a touch operation is performed by the user's right hand, and a lower half region of the entire touch region may be set as a region in which a touch operation is performed by the user's left hand, whereby touch operation regions suitable for the user can be set.

Next, processes performed in the information processing apparatus 3 will be described in detail. Firstly, main data used in processes performed in the information processing apparatus 3 will be described with reference to FIG. 14. It should be noted that FIG. 14 is a diagram showing non-limiting example main data and programs stored in the storage unit 32 of the information processing apparatus 3.

Figure 14:
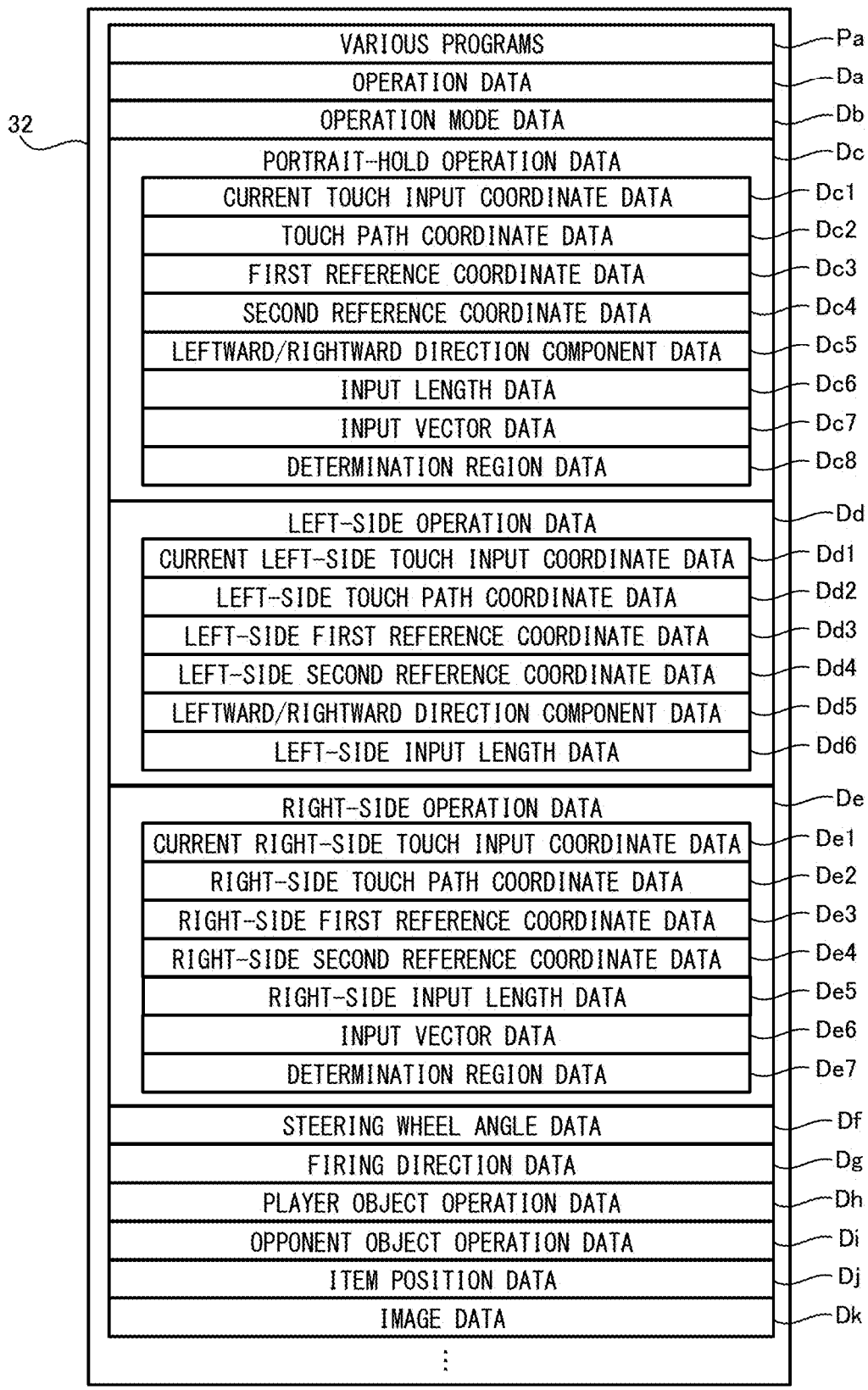
FIG. 14 is a diagram showing a non-limiting example of main data and programs stored in a storage unit 32 of the information processing apparatus 3.

As shown in FIG. 14, the storage unit 32 stores, in a data storage region, operation data Da, operation mode data Db, portrait-hold operation data Dc, left-side operation data Dd, right-side operation data De, steering wheel angle data Df, firing direction data Dg, player object action data Dh, opponent object action data Di, item position data Dj, and image data Dk, etc. It should be noted that the storage unit 32 stores, in addition to data contained in the information of FIG. 14, data required in processes such as data used in an executed application. The storage unit 32 also stores, in a program storage region, various programs Pa including an information processing program (game program), etc.

The operation data Da indicates operation information about the user's operation on the information processing apparatus 3. For example, operation data indicating an operation performed on the input unit 34 including the touch panel is acquired at time intervals that are a unit process time (e.g., 1/60 sec) of the information processing apparatus 3, and the operation data Da is updated with the acquired operation data. In addition, operation data detected by the inertial sensor 37 when the information processing apparatus 3 (the display unit 35) is operated is acquired at intervals which are a unit processing time of the information processing apparatus 3, and is stored in the operation data Da, i.e., the operation data Da is updated in response to the acquisition of that operation data.

The operation mode data Db indicates a set operation mode, specifically, whether the current operation mode is the first mode or the second mode.

The portrait-hold operation data Dc indicates details of an operation performed when the display unit 35 is operated in portrait position (details of an operation in the first mode), including current touch input coordinate data Dc1, touch path coordinate data Dc2, first reference coordinate data Dc3, second reference coordinate data Dc4, leftward/rightward component data Dc5, input length data Dc6, input vector data Dc7, and determination region data Dc8, etc.

The current touch input coordinate data Dc1 indicates the current touch position coordinate point T of a touch operation at a current time on the input unit 34 (touch panel) in the first mode. The touch path coordinate data Dc2 indicates the records (touch path coordinate points) of touch input coordinate points from the time when the touch panel is first touched to the current time. The first reference coordinate data Dc3 indicates a touch input coordinate point where the touch panel is first touched, and indicates a first reference coordinate point (the reference coordinate point R0) that is used to calculate the leftward/rightward component of a swipe input. The second reference coordinate data Dc4 indicates a touch input coordinate point that moves on a touch path in a manner that satisfies a predetermined condition, and indicates a second reference coordinate point (the reference coordinate point Rm) that is used to calculate the upward/downward component of a swipe input. It should be noted that as described above, the leftward/rightward component of a swipe input in the first mode may be calculated with reference to the second reference coordinate point Rm.

The leftward/rightward component data Dc5 indicates the leftward/rightward component of a swipe input in the first mode.

The input length data Dc6 indicates the length of a path of touch positions input in the first mode. The input vector data Dc7 indicates a vector FD from the reference coordinate point Rm toward the current touch position coordinate point T.

The determination region data Dc8 indicates the determination regions UA and LA for determining the upward or downward direction of a swipe input.

The left-side operation data Dd indicates details of an operation performed using the first region A1 when the display unit 35 is operated in landscape position (details of a touch operation in the first region A1 in the second mode), including current left-side touch input coordinate data Dd1, left-side touch path coordinate data Dd2, left-side first reference coordinate data Dd3, left-side second reference coordinate data Dd4, leftward/rightward component data Dd5, and left-side input length data Dd6, etc.

The current left-side touch input coordinate data Dd1 indicates the current left-side touch position coordinate point TL at which a touch operation is currently performed in the first region A1 of the input unit 34 (touch panel) in the second mode. The left-side touch path coordinate data Dd2 indicates a history (touch path coordinate points) of touch input coordinate points in the first region A1 that occur from when the first region A1 is first touched to the current time. The left-side first reference coordinate data Dd3 indicates a touch input coordinate point at which the first region A1 is first touched, and indicates a left-side reference coordinate point (the left-side reference coordinate point RL0) for calculating the leftward/rightward component of a swipe input to the first region A1. The left-side second reference coordinate data Dd4 indicates a touch input coordinate point that is moved on touch path coordinate points in the first region A1 such that a predetermined condition is satisfied, and indicates a left-side reference coordinate point (the left-side reference coordinate point RLm). It should be noted that as described above, the leftward/rightward component of a swipe input in the second mode may be calculated with reference to the left-side reference coordinate point RLm.

The leftward/rightward component data Dd5 indicates the leftward/rightward component of a swipe input to the first region A1 in the second mode.

The left-side input length data Dd6 indicates the length of a path of touch positions input to the first region A1 in the second mode.

The right-side operation data De indicates details of an operation performed using the second region A2 when the display unit 35 is operated in landscape position (details of a touch operation in the second region A2 in the second mode), including current right-side touch input coordinate data De1, right-side touch path coordinate data De2, right-side first reference coordinate data De3, right-side second reference coordinate data De4, right-side input length data De5, input vector data De6, and determination region data De1, etc.

The current right-side touch input coordinate data De1 indicates the current right-side touch position coordinate point TR at which a touch operation is currently performed in the second region A2 of the input unit 34 (touch panel) in the second mode. The right-side touch path coordinate data De2 indicates a history (touch path coordinate points) of touch input coordinate points in the second region A2 that occur from when the second region A2 is first touched to the current time. The right-side first reference coordinate data De3 indicates a touch input coordinate point at which the second region A2 is first touched, and indicates a right-side reference coordinate point (the right-side reference coordinate point RR0). The right-side second reference coordinate data De4 indicates a touch input coordinate point that is moved on touch path coordinate points in the second region A2 such that a predetermined condition is satisfied, and indicates a right-side reference coordinate point (the right-side reference coordinate point RRm) for calculating the upward/downward component of a swipe input to the second region A2.

The right-side input length data De5 indicates the length of a path of touch positions input to the second region A2 in the second mode.

The input vector data De6 indicates a vector FD from the right-side reference coordinate point RRm toward the current right-side touch position coordinate point TR.

The determination region data De1 indicates the determination regions UA and LA for determining the upward or downward direction of a swipe input to the second region A2.

The steering wheel angle data Df indicates a steering wheel angle of the player object PO that is calculated based on the leftward/rightward component of a swipe input. The firing direction data Dg indicates the direction of a projectile item IM fired by the player object PO.

The player object action data Dh indicates an action of the player object PO, and includes the position, speed, orientation, number of laps, standing, etc., of the player object PO in a race. The opponent object action data Di indicates an action of the opponent object EO, and includes the position, speed, orientation, number of laps, standing, etc., of the opponent object EO in a race. The item position data Dj indicates the position of an icon I (the ready-to-use item IP) disposed at the ready-to-use position and the position of a fired icon I (the projectile item IM).

The image data Dk is data for displaying a game image (e.g., an image of the player object PO, an image of the opponent object EO, an image of an item I, an image of a possession frame HF, an image of the item lottery icon AB, an image of another virtual object, a field image of a course, etc., a background image, etc.) on the display unit 35 of the information processing apparatus 3 in the game.

Figure 16:
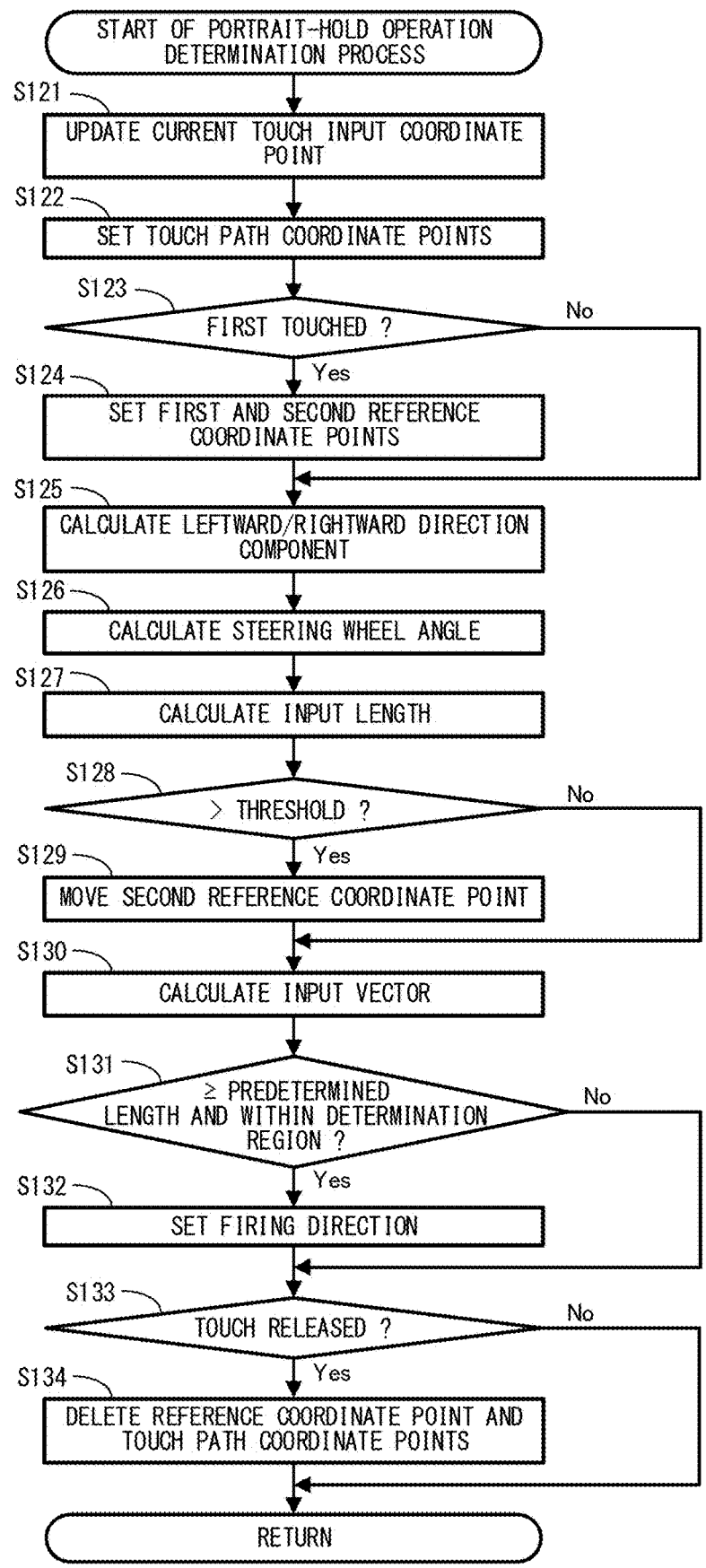
FIG. 16 is a subroutine showing a detailed non-limiting example of a portrait-hold operation determination process in step S105 of FIG. 15.
Figure 17:
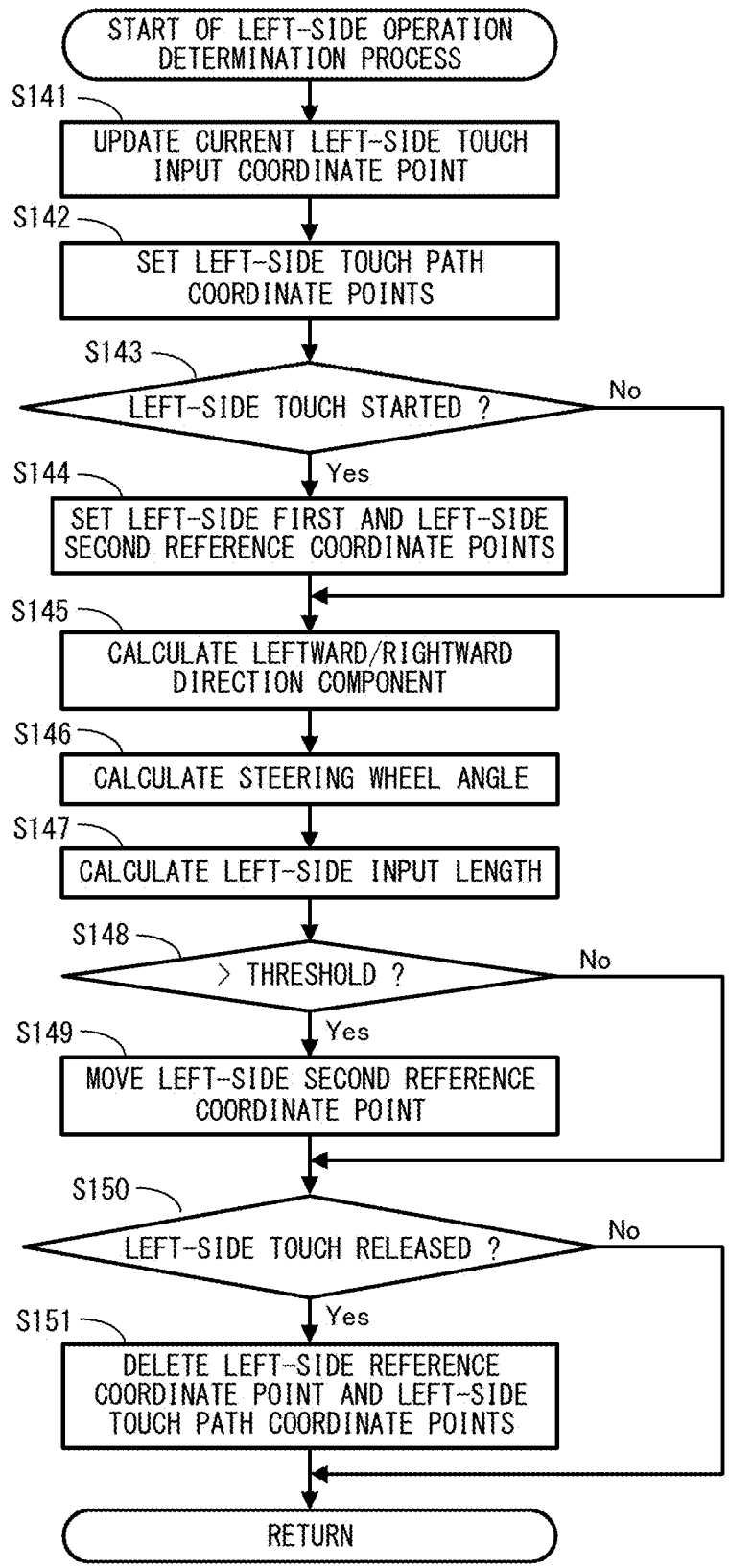
FIG. 17 is a subroutine showing a detailed non-limiting example of a left-side operation determination process in step S106 of FIG. 15.
Figure 18:
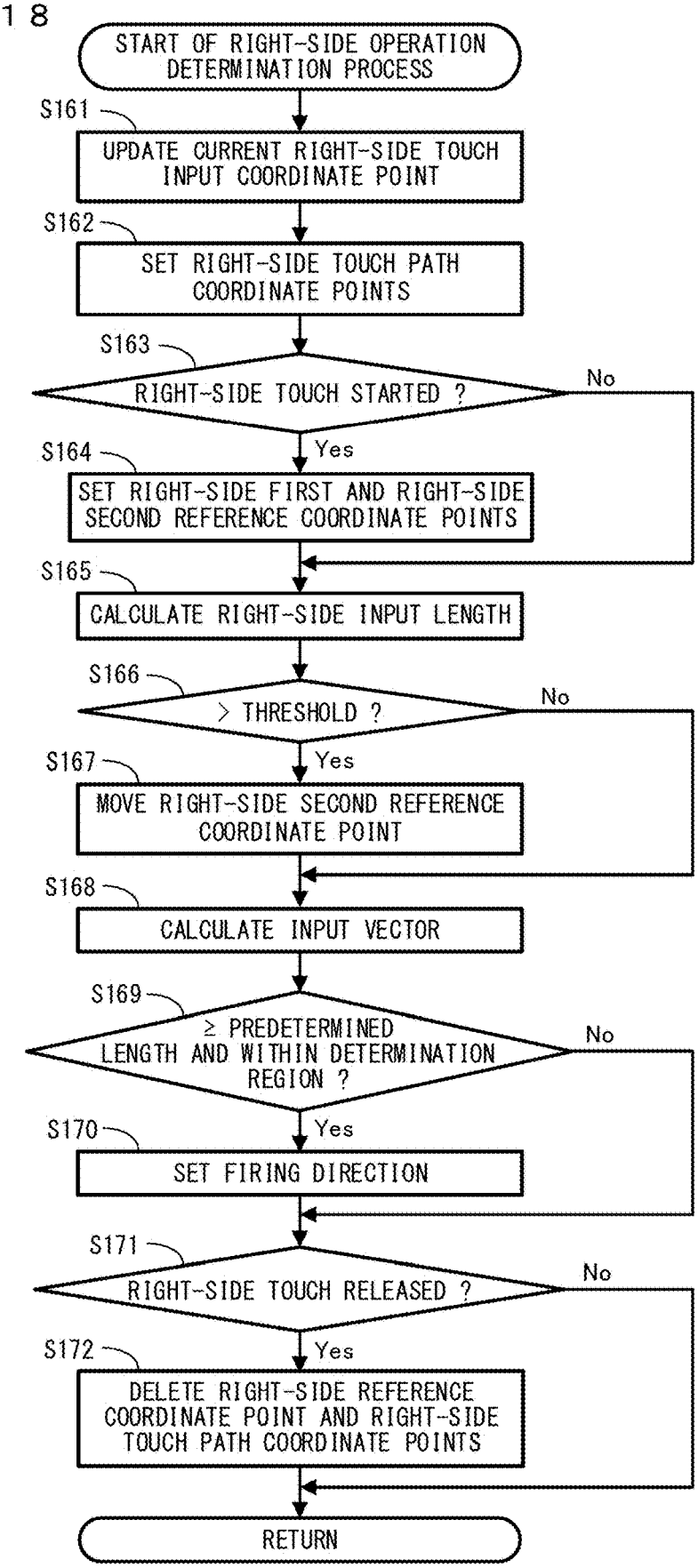
FIG. 18 is a subroutine showing a detailed non-limiting example of a right-side operation determination process in step S107 of FIG. 15.

Next, processes performed in the information processing apparatus 3 will be described in detail with reference to FIGS. 15-18. It should be noted that FIG. 15 is a flowchart showing a non-limiting example process executed in the information processing apparatus 3. FIG. 16 is a subroutine showing a detailed non-limiting example of a portrait-hold operation determination process in step S105 of FIG. 15. FIG. 17 is a subroutine showing a detailed non-limiting example of a left-side operation determination process in step S106 of FIG. 15. FIG. 18 is a subroutine showing a detailed non-limiting example of a right-side operation determination process in step S107 of FIG. 15. Here, of the processes of the information processing system 1 in the flowcharts of FIGS. 15-18, game processes involved in control of the player object PO will be mainly described as a non-limiting example, and other processes that are not directly involved with these processes will not be described in detail. In FIGS. 15-18, each step executed by the control unit 31 is abbreviated to "S."

In the non-limiting example, steps shown in FIGS. 15-18 are performed by the control unit 31 (CPU) executing a game program, etc., stored in the program storage unit 33. It should be noted that the processes of FIGS. 15-18 are started with any appropriate timing. At this time, all or a portion of the game program is read from the storage unit 32 with appropriate timing, and is executed by the control unit 31. Thus, the processes of FIGS. 15-18 are started. It should be noted that the game program is assumed to be previously stored in the program storage unit 33. In another non-limiting example, the game program may be obtained from a storage medium removably attached to the information processing apparatus 3, and stored in the storage unit 32, or may be obtained from another apparatus through a network, such as the Internet, and stored in the storage unit 32.

The steps of the flowcharts of FIGS. 15-18 are merely illustrative, and if a similar result is obtained, the order in which the steps are performed may be changed, and another step may be executed in addition to or instead of each step. Although, in the non-limiting example, it is assumed that each step of the flowcharts is executed by the control unit 31, all or a portion of the steps of the flowcharts may be executed by a processor other than the CPU of the control unit 31 or a dedicated circuit.

In FIG. 15, the control unit 31 sets initial settings (step S101), and proceeds to the next step. For example, the control unit 31 initially sets parameters for use in the subsequent steps.

Next, the control unit 31 acquires operation data from the input unit 34 and the inertial sensor 37, and updates the operation data Da (step S102), and proceeds to the next step.

Next, the control unit 31 determines the operation mode by referring to the operation data Da (step S103), and proceeds to the next step. For example, the control unit 31 calculates the direction of a gravitational acceleration acting on the information processing apparatus 3 (the display unit 35) using any appropriate method based on a detection result (accelerations along three axial directions detected by an acceleration sensor and/or angular velocities about three axes detected by an angular velocity sensor) detected by the inertial sensor 37, which is indicated by the operation data Da. If the direction of the gravitational acceleration acting on the display unit 35 is closer to the longer-axis direction than to the shorter-axis direction of the display unit 35, the control unit 31 determines that the information processing apparatus 3 (the display unit 35) is being held in portrait position, sets the operation mode to the first mode, and updates the operation mode data Db. If the direction of the gravitational acceleration acting on the display unit 35 is closer to the shorter-axis direction than to the longer-axis direction of the display unit 35, the control unit 31 determines that the information processing apparatus 3 (the display unit 35) is being held in landscape position, sets the operation mode to the second mode, and updates the operation mode data Db.

Next, the control unit 31 determines whether or not the current operation mode is the first mode, by referring to the operation mode data Db (step S104). If the current operation mode is the first mode, the control unit 31 proceeds to step S105. Otherwise, i.e., if the current operation mode is the second mode, the control unit 31 proceeds to step S106.

In step S105, the control unit 31 performs a portrait-hold operation determination process, and proceeds to step S108. The portrait-hold operation determination process performed in step S105 will now be described with reference to FIG. 16.

In FIG. 16, the control unit 31 updates a current touch position coordinate point based on the most recent operation data obtained in step S102 (step S121), and proceeds to the next step. For example, the control unit 31 defines, in the display screen of the display unit 35, a display screen coordinate system in which an X-axis extending in the leftward/rightward direction of the display screen (the shorter-axis direction of the display unit 35) (the rightward direction is the positive direction of the X-axis) and a Y-axis extending in the upward/downward direction of the display screen (the longer-axis direction of the display unit 35) (the upward direction is the positive direction of the Y-axis) are set. The control unit 31 obtains, from the most recent operation data obtained in step S102, a touch input coordinate point in the display screen coordinate system at which a touch operation is being performed on the touch panel of the information processing apparatus 3, as a current touch input coordinate point T, and updates the current touch input coordinate data Dc1 using the current touch input coordinate point T. It should be noted that if the most recent operation data obtained in step S102 does not contain a touch input coordinate point at which a touch operation is being performed on the touch panel, the control unit 31 determines that the user has released a touch from the touch panel, and updates the current touch input coordinate data Dc1 using data indicating the release of a touch.

Next, the control unit 31 adds the current touch input coordinate point T updated in step S121 to touch path coordinate points (step S122), and proceeds to the next step. For example, the control unit 31 adds the current touch input coordinate point T updated in step S121 to touch path coordinate points indicated by the touch path coordinate data Dc2, and updates the touch path coordinate data Dc2 using the touch path coordinate points after the addition. It should be noted that if the current touch input coordinate data Dc1 indicates that a touch has been released, the control unit 31 does not update the touch path coordinate data Dc2, and proceeds to the next step.

Next, the control unit 31 determines whether or not the touch panel of the information processing apparatus 3 has been changed to a no-touch state to an initial-touch state (step S123). Thereafter, if the touch panel has been changed from the no-touch state to the initial-touch state, the control unit 31 proceeds to step S124. Otherwise, i.e., if the touch panel has not been changed from the no-touch state to the initial-touch state (e.g., the touch panel is not touched or a touch operation is continued after an initial touch), the control unit 31 proceeds to step S125.

In step S124, the control unit 31 sets a first reference coordinate point and a second reference coordinate point, and proceeds to step S125. For example, the control unit 31 obtains the current touch input coordinate point T updated in step S121 by referring to the current touch input coordinate data Dc1, and sets the current touch input coordinate point T as a first reference coordinate point R0 and a second reference coordinate point Rm in the display screen coordinate system. Thereafter, the control unit 31 updates the first reference coordinate data Dc3 using the set first reference coordinate point R0, and updates the second reference coordinate data Dc4 using the set second reference coordinate point Rm.

In step S125, the control unit 31 calculates the leftward/rightward component of a swipe input to the touch panel, and proceeds to the next step. For example, the control unit 31 obtains the first reference coordinate point R0(X0, Y0) and the current touch position coordinate point T(Xt, Yt) in the display screen coordinate system by referring to the first reference coordinate data Dc3 and the current touch input coordinate data Dc1. Thereafter, the control unit 31 calculates Xt−X0 as the magnitude of the leftward/rightward component (X-axis direction component) in the display screen of the swipe input, and updates the leftward/rightward component data Dc5 using the calculated Xt−X0. It should be noted that in the case where the second reference coordinate point Rm is used to calculate the leftward/rightward component of a swipe input to the touch panel, the control unit 31 obtains the second reference coordinate point Rm(Xm, Ym) and the current touch position coordinate point T(Xt, Yt) in the display screen coordinate system by referring to the second reference coordinate data Dc4 and the current touch input coordinate data Dc1. Thereafter, the control unit 31 calculates Xt−Xm as the magnitude of the leftward/rightward component (X-axis direction component) in the display screen of the swipe input, and updates the leftward/rightward component data Dc5 using the calculated Xt−Xm.

Next, the control unit 31 calculates a steering wheel angle of the player object PO (step S126), and proceeds to the next step. For example, if the leftward/rightward component calculated in step S125 has a positive value, the control unit 31 calculates a clockwise steering wheel angle corresponding to the absolute value of the leftward/rightward component, and updates the steering wheel angle data Df using the steering wheel angle. If the leftward/rightward component calculated in step S125 has a negative value, the control unit 31 calculates an anticlockwise steering wheel angle corresponding to the absolute value of the leftward/rightward component, and updates the steering wheel angle data Df using the steering wheel angle. It should be noted that when a touch is released from the touch panel, the control unit 31 changes and returns the steering wheel angle to the straight-ahead position at a predetermined rate, and updates the steering wheel angle data Df.

Next, the control unit 31 calculates an input length between the second reference coordinate point Rm and the current touch input coordinate point T (step S127), and proceeds to the next step. For example, the control unit 31 calculates an input length along the touch input path between the second reference coordinate point Rm and the current touch position coordinate point T by referring to the current touch input coordinate data Dc1, the touch path coordinate data Dc2, and the second reference coordinate data Dc4, and updates the input length data Dc6 using the input length.

Next, the control unit 31 determines whether or not the input length calculated in step S127 is greater than a predetermined threshold L (step S128). If the input length is greater than the predetermined threshold L, the control unit 31 proceeds to step S129. Otherwise, i.e., if the input length is smaller than or equal to the predetermined threshold L, the control unit 31 proceeds to step S130.

In step S129, the control unit 31 moves the second reference coordinate point Rm such that the input length becomes smaller than or equal to the threshold L, and proceeds to step S130. For example, in order to reduce the input length calculated in step S127 at a predetermined rate to a length smaller than or equal to the threshold L, the control unit 31 sequentially deletes records of touch position coordinate points T that are beyond the threshold L based on the predetermined rate, and after the deletion process, sets the position of the most previous touch position coordinate point T as the second reference coordinate point Rm. As a result, the control unit 31 moves the second reference coordinate point Rm along the touch input path in the direction of the current touch position coordinate point T, and updates the second reference coordinate data Dc4 using the moved second reference coordinate point Rm.

In step S130, the control unit 31 calculates the input vector FD, and proceeds to the next step. For example, the control unit 31 calculates the input vector FD from the second reference coordinate point Rm to the current touch position coordinate point T in the display screen coordinate system by referring to the current touch input coordinate data Dc1 and the second reference coordinate data Dc4, and updates the input vector data Dc7 using the input vector FD.

Next, the control unit 31 determines whether or not the length of the input vector FD is greater than or equal to a predetermined length and the direction of the input vector FD is within a predetermined determination region (step S131). If the length of the input vector FD is greater than or equal to the predetermined length and the direction of the input vector FD is within the determination region, the control unit 31 proceeds to step S132. Otherwise, i.e., if the length of the input vector FD is not greater than or equal to the predetermined length or the direction of the input vector FD is not within the determination region, the control unit 31 deletes the firing direction indicated by the firing direction data Dg, and proceeds to step S133. For example, the control unit 31 obtains the forward-direction determination region UA that is a predetermined angle range around the positive direction of the Y-axis as a center thereof, and the backward-direction determination region LA that is a predetermined angle range around the negative direction of the Y-axis as a center thereof, by referring to the determination region data Dc8. If the length of the input vector FD calculated in step S130 is greater than or equal to the predetermined length, and the direction of the input vector FD is within the forward-direction determination region UA or the backward-direction determination region LA, the result of determination by the control unit 31 in step S131 is positive.

In step S132, the control unit 31 sets the firing direction, and proceeds to step S133. For example, if the direction of the input vector FD calculated in step S130 is within the forward-direction determination region UA, the control unit 31 sets the direct forward direction of the player object PO as the firing direction, and updates the firing direction data Dg using the firing direction. If the direction of the input vector FD calculated in step S130 is within the backward-direction determination region LA, the control unit 31 sets the direct backward direction of the player object PO as the firing direction, and updates the firing direction data Dg using the firing direction. It should be noted that the control unit 31 may set, as the firing direction, a direction that deviates from the direct forward direction or direct backward direction of the player object PO by the difference in angle between the Y-axis direction and the direction of the input vector FD.

In step S133, the control unit 31 determines whether or not the touch operation performed on the touch panel of the information processing apparatus 3 has been changed to the no-touch state. If the touch operation performed on the touch panel has been changed to the no-touch state, the control unit 31 proceeds to step S134. Otherwise, i.e., if the touch operation performed on the touch panel has not been changed to the no-touch state (e.g., a touch operation is not being continued after a touch is released, the touch panel is first touched, and a touch operation is being continued after the touch panel is first touched), the control unit 31 ends the process of the subroutine.

In step S134, the control unit 31 deletes the first reference coordinate point R0, the second reference coordinate point Rm, and the touch path coordinate points, and ends the process of the subroutine. For example, the control unit 31 deletes the first reference coordinate point R0 indicated by the first reference coordinate data Dc3, the second reference coordinate point Rm indicated by the second reference coordinate data Dc4, and the touch path coordinate points indicated by the touch path coordinate data Dc2.

Referring again to FIG. 15, if it is determined in step S104 that the current operation mode is the second mode, the control unit 31 performs a left-side operation determination process (step S106), and proceeds to step S107. The left-side operation determination process performed in step S106 will now be described with reference to FIG. 17.

In FIG. 17, the control unit 31 updates a current left-side touch position coordinate point based on the most recent operation data obtained in step S102 (step S141), and proceeds to the next step. For example, the control unit 31 defines, in the display screen of the display unit 35, a display screen coordinate system in which an X-axis (the leftward direction is the positive direction of the X-axis) extending in the leftward/rightward direction of the display screen (the longer-axis direction of the display unit 35) and a Y-axis (the upward direction is the positive direction of the Y-axis) extending in the upward/downward direction of the display screen (the shorter-axis direction of the display unit 35) are set. The control unit 31 obtains, from the most recent operation data obtained in step S102, a touch input coordinate point in the display screen coordinate system at which a touch operation is being performed in the first region A1, as a current left-side touch input coordinate point TL, and updates the current left-side touch input coordinate data Dd1 using the current left-side touch input coordinate point TL. It should be noted that if the most recent operation data obtained in step S102 contains two touch input coordinate points at which a touch operation is being performed in the first region A1, the control unit 31 designates a middle point between the touch input coordinate points as the current left-side touch input coordinate point TL, and updates the current left-side touch input coordinate data Dd1. If the most recent operation data obtained in step S102 does not contain a touch input coordinate point at which a touch operation is being performed in the first region A1, the control unit 31 determines that a touch has been released from the first region A1, and updates the current left-side touch input coordinate data Dd1 using data indicating the release of a touch.

Next, the control unit 31 adds the current left-side touch input coordinate point TL updated in step S141 to left-side touch path coordinate points (step S142), and proceeds to the next step. For example, the control unit 31 adds the current left-side touch input coordinate point TL updated in step S141 to left-side touch path coordinate points indicated by the left-side touch path coordinate data Dd2, and updates the left-side touch path coordinate data Dd2 using the left-side touch path coordinate points after the addition. It should be noted that if the current left-side touch input coordinate data Dd1 indicates that a touch has been released, the control unit 31 does not update the left-side touch path coordinate data Dd2, and proceeds to the next step.

Next, the control unit 31 determines whether or not a touch operation has been started in the first region A1 (step S143). For example, if the first region A1 has been first touched or a touch operation has been performed from the second region A2 to the first region A1 across a border therebetween, the result of determination by the control unit 31 in step S143 is positive. If a touch operation has been started in the first region A1, the control unit 31 proceeds to step S144. Otherwise, i.e., if a touch operation has not been started in the first region A1 (e.g., a touch operation has not been performed in the first region A1 or a touch operation is being continued in the first region A1), the control unit 31 proceeds to step S145.

In step S144, the control unit 31 sets a left-side first reference coordinate point and a left-side second reference coordinate point, and proceeds to step S125. For example, the control unit 31 obtains the current left-side touch input coordinate point TL updated in step S141 by referring to the current left-side touch input coordinate data Dd1, and sets the current left-side touch input coordinate point TL as the left-side first reference coordinate point RL0 and the left-side second reference coordinate point RLm in the display screen coordinate system. Thereafter, the control unit 31 updates the left-side first reference coordinate data Dd3 using the set left-side first reference coordinate point RL0, and updates the left-side second reference coordinate data Dd4 using the set left-side second reference coordinate point RLm.

In step S145, the control unit 31 calculates the leftward/rightward component of a swipe input to the first region A1, and proceeds to the next step. For example, the control unit 31 obtains a left-side first reference coordinate point RL0 (XL0, YL0) and a current left-side touch position coordinate point TL(XtL, YtL) in the display screen coordinate system by referring to the left-side first reference coordinate data Dd3 and the current left-side touch input coordinate data Dd1. Thereafter, the control unit 31 calculates XtL−XL0 as the magnitude of the leftward/rightward component (X-axis direction component) in the display screen of the swipe input, and updates the leftward/rightward component data Dd5 using the calculated XtL−XL0. It should be noted that in the case where the left-side second reference coordinate point RLm is used to calculate the leftward/rightward component of a swipe input to the touch panel, the control unit 31 obtains a left-side second reference coordinate point RLm(XLm, YLm) and a current touch position coordinate point T(XtL, YtL) in the display screen coordinate system by referring to the left-side second reference coordinate data Dd4 and the current left-side touch input coordinate data Dd1. Thereafter, the control unit 31 calculates XtL−XLm as the magnitude of the leftward/rightward component (X-axis direction component) in the display screen of the swipe input, and updates the leftward/rightward component data Dd5 using the calculated XtL−XLm.

Next, the control unit 31 calculates a steering wheel angle of the player object PO (step S146), and proceeds to the next step. For example, if the leftward/rightward component calculated in step S145 has a positive value, the control unit 31 calculates a clockwise steering wheel angle corresponding to the absolute value of the leftward/rightward component, and updates the steering wheel angle data Df using the steering wheel angle. If the leftward/rightward component calculated in step S125 has a negative value, the control unit 31 calculates an anticlockwise steering wheel angle corresponding to the absolute value of the leftward/rightward component, and updates the steering wheel angle data Df using the steering wheel angle. It should be noted that when a touch operation is not being performed in the first region A1, the control unit 31 changes and returns the steering wheel angle to the straight-ahead position at a predetermined rate, and updates the steering wheel angle data Df.

Next, the control unit 31 calculates a left-side input length between the left-side second reference coordinate point RLm and the current left-side touch input coordinate point TL (step S147), and proceeds to the next step. For example, the control unit 31 calculates a left-side input length along the left-side touch input path between the left-side second reference coordinate point RLm and the current left-side touch position coordinate point TL by referring to the current left-side touch input coordinate data Dd1, the left-side touch path coordinate data Dd2, and the left-side second reference coordinate data Dd4, and updates the left-side input length data Dd6 using the left-side input length.

Next, the control unit 31 determines whether or not the left-side input length calculated in step S147 is greater than a predetermined threshold L (step S148). If the left-side input length is greater than the predetermined threshold L, the control unit 31 proceeds to step S149. Otherwise, i.e., if the left-side input length is smaller than or equal to the predetermined threshold L, the control unit 31 proceeds to step S150.

In step S149, the control unit 31 moves the left-side second reference coordinate point RLm such that the left-side input length becomes smaller than or equal to the threshold L, and proceeds to step S150. For example, in order to reduce the left-side input length calculated in step S157 at a predetermined rate to a length smaller than or equal to the threshold L, the control unit 31 sequentially deletes records of left-side touch position coordinate points TL that are beyond the threshold L based on the predetermined rate, and after the deletion process, sets the position of the most previous left-side touch position coordinate point TL as the left-side second reference coordinate point RLm. As a result, the control unit 31 moves the left-side second reference coordinate point RLm along the left-side touch input path in the direction of the current left-side touch position coordinate point TL, and updates the left-side second reference coordinate data Dd4 using the moved left-side second reference coordinate point RLm.

In step S150, the control unit 31 determines whether or not a touch operation has been ended in the first region A1. For example, if a touch has been released from the first region A1 or a touch operation has been performed from the first region A1 to the second region A2 across a border therebetween, the result of determination by the control unit 31 in step S150 is positive. If a touch operation has been ended in the first region A1, the control unit 31 proceeds to step S151. Otherwise, i.e., if a touch operation has not been ended in the first region A1 (e.g., a touch operation is not being continued in the first region A1, or the first region A1 has been first touched, or a touch operation is being continued in the first region A1 after the first region A1 has been first touched), the control unit 31 ends the subroutine.

In step S151, the control unit 31 deletes the left-side first reference coordinate point RL0, the left-side second reference coordinate point RLm, and the left-side touch path coordinate points, and ends the subroutine. For example, the control unit 31 deletes the left-side first reference coordinate point RL0 indicated by the left-side first reference coordinate data Dd3, the left-side second reference coordinate point RLm indicated by the left-side second reference coordinate data Dd4, and the left-side touch path coordinate points indicated by the left-side touch path coordinate data Dd2.

Referring again to FIG. 15, after the left-side operation determination process in step S106, the control unit 31 performs a right-side operation determination process (step S107), and proceeds to step S108. The right-side operation determination process performed in step S107 will now be described with reference to FIG. 18.

In FIG. 18, the control unit 31 updates a current right-side touch position coordinate point based on the most recent operation data obtained in step S102 (step S161), and proceeds to the next step. For example, the control unit 31 obtains, from the most recent operation data obtained in step S102, a touch input coordinate point in the display screen coordinate system at which a touch operation is being performed in the second region A2, as a current right-side touch input coordinate point TR, and updates the current right-side touch input coordinate data De1 using the current right-side touch input coordinate point TR. It should be noted that if the most recent operation data obtained in step S102 contains two touch input coordinate points at which a touch operation is being performed in the second region A2, the control unit 31 designates a middle point between the touch input coordinate points as the current right-side touch input coordinate point TR, and updates the current right-side touch input coordinate data De1. If the most recent operation data obtained in step S102 does not contain a touch input coordinate point at which a touch operation is being performed in the second region A2, the control unit 31 determines that a touch has been released from the second region A2, and updates the current right-side touch input coordinate data De1 using data indicating the release of a touch.

Next, the control unit 31 adds the current right-side touch input coordinate point TR updated in step S161 to right-side touch path coordinate points (step S142), and proceeds to the next step. For example, the control unit 31 adds the current right-side touch input coordinate point TR updated in step S161 to right-side touch path coordinate points indicated by the right-side touch path coordinate data De2, and updates the right-side touch path coordinate data De2 using the right-side touch path coordinate points after the addition. It should be noted that if the current right-side touch input coordinate data De1 indicates that a touch has been released, the control unit 31 does not update the right-side touch path coordinate data De2, and proceeds to the next step.

Next, the control unit 31 determines whether or not a touch operation has been started in the second region A2 (step S163). For example, if the second region A2 has been first touched or a touch operation has been performed from the first region A1 to the second region A2 across a border therebetween, the result of determination by the control unit 31 in step S163 is positive. If a touch operation has been started in the second region A2, the control unit 31 proceeds to step S164. Otherwise, i.e., if a touch operation has not been started in the second region A2 (e.g., a touch operation has not been performed in the second region A2 or a touch operation is being continued in the second region A2), the control unit 31 proceeds to step S165.

In step S164, the control unit 31 sets a right-side first reference coordinate point and a right-side second reference coordinate point, and proceeds to step S165. For example, the control unit 31 obtains the current right-side touch input coordinate point TR updated in step S161 by referring to the current right-side touch input coordinate data De1, and sets the current right-side touch input coordinate point TR as the right-side first reference coordinate point RR0 and the right-side second reference coordinate point RRm in the display screen coordinate system. Thereafter, the control unit 31 updates the right-side first reference coordinate data De3 using the set right-side first reference coordinate point RR0, and updates the right-side second reference coordinate data De4 using the set right-side second reference coordinate point RRm.

In step S165, the control unit 31 calculates a right-side input length between the right-side second reference coordinate point RRm and the current right-side touch input coordinate point TR, and proceeds to the next step. For example, the control unit 31 calculates a right-side input length along the right-side touch input path between the right-side second reference coordinate point RRm and the current right-side touch position coordinate point TR by referring to the current right-side touch input coordinate data De1, the right-side touch path coordinate data De2, and the right-side second reference coordinate data De4, and updates the right-side input length data De6 using the right-side input length.

Next, the control unit 31 determines whether or not the right-side input length calculated in step S165 is greater than a predetermined threshold L (step S166). If the right-side input length is greater than the predetermined threshold L, the control unit 31 proceeds to step S167. Otherwise, i.e., if the right-side input length is smaller than or equal to the predetermined threshold L, the control unit 31 proceeds to step S168.

In step S167, the control unit 31 moves the right-side second reference coordinate point RRm such that the right-side input length becomes smaller than or equal to the threshold L, and proceeds to step S168. For example, in order to reduce the right-side input length calculated in step S165 at a predetermined rate to a length smaller than or equal to the threshold L, the control unit 31 sequentially deletes records of right-side touch position coordinate points TR that are beyond the threshold L based on the predetermined rate, and after the deletion process, sets the position of the most previous right-side touch position coordinate point TR as the right-side second reference coordinate point RRm. As a result, the control unit 31 moves the right-side second reference coordinate point RRm along the right-side touch input path in the direction of the current right-side touch position coordinate point TR, and updates the right-side second reference coordinate data De4 using the moved right-side second reference coordinate point RRm.

In step S168, the control unit 31 calculates the input vector FD, and proceeds to the next step. For example, the control unit 31 calculates the input vector FD from the right-side second reference coordinate point RRm to the current right-side touch position coordinate point TR in the display screen coordinate system by referring to the current right-side touch input coordinate data De1 and the right-side second reference coordinate data De4, and updates the input vector data De6 using the input vector FD.

Next, the control unit 31 determines whether or not the length of the input vector FD is greater than or equal to a predetermined length and the direction of the input vector FD is within a predetermined determination region (step S169). If the length of the input vector FD is greater than or equal to the predetermined length and the direction of the input vector FD is within the determination region, the control unit 31 proceeds to step S170. Otherwise, i.e., if the length of the input vector FD is not greater than or equal to the predetermined length or the direction of the input vector FD is not within the determination region, the control unit 31 deletes the firing direction indicated by the firing direction data Dg, and proceeds to step S171. For example, the control unit 31 obtains the forward-direction determination region UA that is a predetermined angle range around the positive direction of the Y-axis as a center thereof, and the backward-direction determination region LA that is a predetermined angle range around the negative direction of the Y-axis as a center thereof, by referring to the determination region data De1. If the length of the input vector FD calculated in step S168 is greater than or equal to the predetermined length, and the direction of the input vector FD is within the forward-direction determination region UA or the backward-direction determination region LA, the result of determination by the control unit 31 in step S169 is positive.

In step S170, the control unit 31 sets the firing direction, and proceeds to step S171. For example, if the direction of the input vector FD calculated in step S168 is within the forward-direction determination region UA, the control unit 31 sets the direct forward direction of the player object PO as the firing direction, and updates the firing direction data Dg using the firing direction. If the direction of the input vector FD calculated in step S168 is within the backward-direction determination region LA, the control unit 31 sets the direct backward direction of the player object PO as the firing direction, and updates the firing direction data Dg using the firing direction. It should be noted that the control unit 31 may set, as the firing direction, a direction that deviates from the direct forward direction or direct backward direction of the player object PO by the difference in angle between the Y-axis direction and the direction of the input vector FD.

In step S171, the control unit 31 determines whether or not a touch operation has been ended in the second region A2. For example, if a touch has been released from the second region A2 or a touch operation has been performed from the second region A2 to the first region A1 across a border therebetween, the result of determination by the control unit 31 in step S171 is positive. If a touch operation has been ended in the second region A2, the control unit 31 proceeds to step S172. Otherwise, i.e., if a touch operation has not been ended in the second region A2 (e.g., a touch operation is not being continued in the second region A2, or the second region A2 has been first touched, or a touch operation is being continued in the second region A2 after the second region A2 has been first touched), the control unit 31 ends the subroutine.

In step S172, the control unit 31 deletes the right-side first reference coordinate point RR0, the right-side second reference coordinate point RRm, and the right-side touch path coordinates, and ends the subroutine. For example, the control unit 31 deletes the right-side first reference coordinate point RR0 indicated by the right-side first reference coordinate data De3, the right-side second reference coordinate point RRm indicated by the right-side second reference coordinate data De4, and the right-side touch path coordinates indicated by the right-side touch path coordinate data De2.

Referring again to FIG. 15, in step S108, the control unit 31 performs the first item lottery process, and proceeds to the next step. Here, in the first item lottery process, the control unit 31 causes the player object PO to acquire an item I by a lottery when a predetermined condition is satisfied, and to use the acquired item I, for example.

For example, as described above, in the first item lottery process, when the player object PO passes by or through an item box IB and thereby opens the item box IB, a lottery event for acquiring a new item I is performed. In the case of some lottery result, the player object PO acquires a new item I, and an event showing winning of the "fever state" is performed. The control unit 31 also performs a process of causing the player object PO to use a possessed item I. For example, if a firing direction is set in the firing direction data Dg, and a fireable item I is ready to use, the control unit 31 performs an item use process of firing and moving the item I as a projectile item IM from near the player object PO, and updates the player object action data Dh and the item position data Dj.

It should be noted that in step S108, in the case where the item I is used, the control unit 31 may delete the firing direction indicated by firing direction data Dg, and the second reference coordinate point Rm indicated by the second reference coordinate data Dc4 or the right-side second reference coordinate point RRm indicated by the right-side second reference coordinate data De4, or may maintain these data without any change. In the former case, in order to use the item I again, it is necessary to touch the touch panel again and perform a swipe operation in a direction in which the item I should be used. In the latter case, when the item I is ready to use, the item I is immediately used based on the maintained firing direction and second reference coordinate point Rm or right-side second reference coordinate point RRm.

Next, the control unit 31 performs a second item lottery process (step S109), and proceeds to the next step. Here, if a predetermined condition for the second item lottery process is satisfied, the control unit 31 causes an item lottery icon AB to appear. When the item lottery icon AB is used, a process such as an item lottery process for obtaining a new item I is performed, for example.

For example, as described above, in the second item lottery process, if a predetermined condition is satisfied when the player object PO is traveling, the control unit 31 causes the item lottery icon AB to appear instead of the possession frames HF. Here, in the case of the first mode in which the display unit 35 is being held in portrait position, the control unit 31 causes the item lottery icon AB to appear at or near the center of an upper portion of the display screen of the display unit 35 (see FIG. 11). In the case of the second mode in which the display unit 35 is being held in landscape position, the control unit 31 causes the item lottery icon AB to appear at or near the center of an upper portion of the second region A2 of the display unit 35 (see FIG. 13). When the item lottery icon AB is selected by the user's touch operation, the control unit 31 performs an item lottery event for acquiring new item I, and causes the player object PO to acquire a new item I, depending on the result of the lottery.

Next, the control unit 31 performs a process of setting a motion of the player object PO (step S110), and proceeds to the next step. For example, the control unit 31 sets the position and orientation of the player object PO, taking into consideration a steering wheel angle indicated by the steering wheel angle data Df and influences of other virtual objects, or the like, and determines a motion, position, orientation, etc., of the player object PO, taking into consideration a state of the player object PO set in the player object motion data Dh, and updates the player object motion data Dh.

Next, the control unit 31 performs a process of setting an action of the opponent object EO (step S111), and proceeds to the next step. As a non-limiting example, in the case where the action of the opponent object EO is controlled by the control unit 31, the control unit 31 causes the opponent object EO to perform an action according to a predetermined algorithm, and updates opponent object data Di based on the action. As another non-limiting example, in the case where the action of the opponent object EO is controlled by the user of another information processing apparatus 3 that can be communicated with, the control unit 31 causes the opponent object EO to perform an action based on an operation performed by the user of the second information processing apparatus 3, in a manner similar to that of the player object PO, and updates the opponent object data Di based on the action.

Next, the control unit 31 performs a process of setting an action of an item (step S112), and proceeds to the next step. For example, the control unit 31 performs a process of moving the projectile item IM that has been set for use and fired from the player object PO by the above process, based on the firing direction data Dg, and updates the item position data Di based on the position and orientation after the movement of the projectile item IM.

Next, the control unit 31 performs a display control process of generating and displaying a display image on the display unit 35 (step S113), and proceeds to the next step. For example, the control unit 31 generates a display image corresponding to the result of a process in each step, based on the player object action data Dh, the opponent object data Di, and the item position data Dj, etc., and displaying the display image on the display unit 35. The control unit 31 also moves the position of the virtual camera for generating the display image based on the position of the player object PO, and when the operation mode is changed, changes the angle of view and distance from the gaze point of the virtual camera to those for the portrait screen or the landscape screen based on the orientation of the display unit 35 with respect to the direction of gravity in real space. It should be noted that when the display unit 35 is being held in portrait position, the display direction of an image displayed on the display unit 35 is changed such that the upward/downward direction of the display image corresponds to the longer-axis direction of the display unit 35, and the downward direction of the display image is closer to the direction of gravity acting on the display unit 35 than is the upward direction of the display image. When the display unit 35 is being held in landscape position, the display direction of an image displayed on the display unit 35 is changed such that the upward/downward direction of the display image corresponds to the shorter-axis direction of the display unit 35, and the downward direction of the display image is closer to the direction of gravity acting on the display unit 35 than is the upward direction of the display image.

Next, the control unit 31 determines whether or not to end the game process (step S114). A condition under which the game process is ended is, for example, that a condition for ending the game process is satisfied, that an operation for ending the game process has been performed by the user, etc. If the control unit 31 continues the game process, the control unit 31 returns to and repeats step S102. If the control unit 31 ends the game process, the control unit 31 ends the process of the flowchart.

Thus, in the information processing system 1 that performs the above game process, the movement direction of the player object PO can be controlled by performing a touch operation leftward or rightward in both of the first mode and the second mode, and the firing of an item I can be controlled by performing a touch operation upward or downward in both of the first mode and the second mode. Therefore, if an operation has been learned in one of the two operation modes, an operation can be easily performed in the other operation mode, and therefore, operations in operation modes in which different operating methods are used can be easily learned. In addition, in the information processing system 1 that performs the above game process, even when a touch operation is started from an operation region that is not intended by the user (e.g., the second region A2), control is not performed by a touch operation performed in that operation region, and is changed to control that is performed by an operation using an operation region intended by the user (e.g., the first region A1). Therefore, an operation object that is being changed is not changed to another operation object during the touch operation, resulting in an improvement in the operability of touch operations.

In the second mode, there are two separate regions, i.e., a region (the first region A1) for detecting the leftward/rightward component of a swipe operation as a steering operation, and a region (the second region A2) for detecting the upward/downward component of a swipe operation as a firing operation. Even if an upward/downward component is detected in the region for detecting a leftward/rightward component, the upward/downward component is not dealt with as a firing operation. Even if a leftward/rightward component is detected in the region for detecting an upward/downward component, the leftward/rightward component is not dealt with as a steering operation. Therefore, incorrect operations can be prevented, including a steering operation that is undeliberately performed due to detection of a leftward/rightward component of a touch operation when the touch operation is being performed and intended as a firing operation, and a firing operation that is undeliberately performed due to detection of an upward/downward component of a touch operation when the touch operation is being performed and intended as a steering operation.

Although in the above example, the touch panel covering the display screen of the display unit 35 is used as a non-limiting example of the input unit 34 for detecting a touch operation, other devices such as a touch pad may be used. As a non-limiting example, in the case where a game system is used in which an operation is performed using a separate controller while viewing a game image displayed on a stationary monitor, a touch operation may be performed using a touch pad included in the controller.

Although in the above example, the display direction of an image displayed on the display unit 35 is changed by 90° when operation modes are changed, operation modes may be changed without changing of the display direction of an image. Alternatively, even when the orientation of the display unit 35 is not changed in real space, operation modes may be changed. As a non-limiting example, even when the display unit 35 is operated in portrait position, the operation mode may be changed from the first mode to the second mode.

Although the information processing system 1 includes the server 200 that can communicate with the information processing apparatus 3, the information processing apparatus 3 may perform the game process alone without connecting to the server 200. In particular, a racing game in which the user operates the player object PO can be executed without through the server 200, and therefore, can be carried out by an internal process of the information processing apparatus 3. In addition, even in a racing game in which a plurality of information processing apparatuses 3 participate, the game process may be carried out by communication between the information processing apparatuses 3 or between the information processing apparatuses 3 and other apparatuses without through the server 200. A portion of the process of performing a racing game according to the user's operation of the player object PO may be executed by the server 200. As a result, processes in a plurality of information processing apparatuses 3 can be managed by the server 200 in a centralized fashion.

In the foregoing, the information process and the communication process are performed in the information processing apparatus 3. Alternatively, at least a portion of the steps in the processes may be performed in another apparatus. For example, steps in the processes may be executed in cooperation with the server 200 or another apparatus (e.g., another server, another game apparatus, or another mobile terminal) that can communicate with the information processing apparatus 3. Thus, processes similar to the above processes can be performed by the server 200 or another apparatus performing a portion of the steps of the processes. The above processes may be executed by a single processor or a plurality of cooperating processors included in an information processing system including at least one information processing apparatus. In the above non-limiting example, the processes shown in the flowcharts are performed by the control unit 31 of the information processing apparatus 3 executing a predetermined program. Alternatively, all or a portion of the above processes may be performed by a dedicated circuit included in the information processing apparatus 3.

Here, according to the above variation, this non-limiting example can be implanted in a so-called cloud computing system form or distributed wide-area and local-area network system forms. For example, in a distributed local-area network system, the above processes can be executed by cooperation between a stationary information processing apparatus (stationary game apparatus) and a mobile information processing apparatus (handheld game apparatus). It should be noted that, in these system forms, each of the above steps may be performed by any suitable one of the apparatuses, and this non-limiting example may be implemented by assigning the steps to the apparatuses in any suitable manner.

The order of steps, setting values, conditions for determination, etc., used in the above information process are merely for illustrative purposes, and other order of steps, setting values, conditions for determination, etc., may be used to implement this non-limiting example.

The above information processing program may be supplied to the information processing apparatus 3 not only through an external storage medium, such as an external memory, but also through a wired or wireless communication line. The program may be previously stored in a non-volatile storage device in the information processing apparatus 3. Examples of an information storage medium storing the program may include non-volatile memories, and in addition, CD-ROMs, DVDs, optical disk-shaped storage media similar thereto, and flexible disks, hard disks, magneto-optical disks, magnetic tapes, etc. The information storage medium storing the program may be a volatile memory storing the program. Such a storage medium may be said as a storage medium that can be read by a computer, etc. For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example embodiment and common technical knowledge. It should be understood throughout the present specification that expression of a singular form includes the concept of their plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example embodiment pertain. If there is any inconsistency or conflict, the present specification (including the definitions) shall prevail.

As described above, this non-limiting example is useful for, for example, information processing programs, information processing apparatuses, information processing systems, and information processing methods, etc., for the purpose of facilitating learning of operations in different operation modes in which different operating methods are used.

What is claimed is:

1. A non-transitory computer-readable storage medium having stored therein instructions that, when executed by a computer of an information processing apparatus that includes a touchscreen having a touch region and controls a game using a coordinate input detected by the touchscreen, cause the computer to perform operations comprising:
   changing an upward/downward direction of an image displayed on the touchscreen between a first and a second display direction that is different from the first display direction by 90 degrees, depending on an orientation of the touchscreen with respect to the direction of gravity;
   changing an operation mode between a first mode in which the upward/downward direction of the image is the first display direction and a second mode in which the upward/downward direction of the image is the second display direction;
   setting a reference coordinate point based on a coordinate point of the detected coordinate input;
   performing a first control on the game;
   performing a second control different from the first control on the game; and setting a first and a second region in the touch region, wherein the first and second regions do not overlap each other, wherein
- in the first mode, a first reference coordinate point is set as the reference coordinate point based on the coordinate point of the detected coordinate input,
- in the second mode, a first region reference coordinate point is set as the reference coordinate point in the first region based on the coordinate input performed in the first region, and a second region reference coordinate point is set as the reference coordinate point in the second region based on the coordinate input performed in the second region,
- in the first mode, a direction of the first control to be performed on the game is determined based on a component in a first axial direction of a difference between the first reference coordinate point and a coordinate point of the coordinate input performed after the setting of the first reference coordinate point,
- in the first mode, a direction of the second control to be performed on the game is determined based on a component in a second axial direction of the difference between the first reference coordinate point and the coordinate point of the coordinate input performed after the setting of the first reference coordinate point, the second axial direction being different from the first axial direction,
- in the second mode, the direction of the first control is determined based on a component in a third axial direction of a difference between the first region reference coordinate point and a coordinate point of the coordinate input performed in the first region after the setting of the first region reference coordinate point, and
- in the second mode, the direction of the second control is determined based on a component in a fourth axial direction of a difference between the second region reference coordinate point and a coordinate point of the coordinate input performed in the second region after the setting of the second region reference coordinate point, the fourth axial direction being different from the third axial direction.

2. The non-transitory computer-readable storage medium according to claim 1, wherein the direction of the second control is not determined by the component in the fourth axial direction of the difference between the first region reference coordinate point and the coordinate point of the coordinate input performed in the first region after the setting of the first region reference coordinate point.

3. The non-transitory computer-readable storage medium according to claim 1, wherein the direction of the first control is not determined by the component in the third axial direction of the difference between the second region reference coordinate point and the coordinate point of the coordinate input performed in the second region after the setting of the second region reference coordinate point.

4. The non-transitory computer-readable storage medium according to claim 1, wherein in the first mode, the direction of the first control to be performed on the game is determined based on a component in the first axial direction of a difference between the first reference coordinate point and the coordinate point of the coordinate input performed in the first region, continuously following the setting of the first reference coordinate point.

5. The non-transitory computer-readable storage medium according to claim 1, wherein the instructions cause the computer to perform operations further comprising: disposing a first image for giving an instruction to perform control related to the first control, in the first region on the touchscreen, in the second mode compared to the first mode.

6. The non-transitory computer-readable storage medium according to claim 1, wherein the instructions cause the computer to perform operations further comprising: disposing a second image for giving an instruction to perform control related to the second control, in the second region on the touchscreen, in the second mode compared to the first mode.

7. The non-transitory computer-readable storage medium according to claim 1, wherein even when the first control based on the coordinate input performed in the first region after the setting of the first region reference coordinate point is being performed, the second control based on the coordinate input in the second region is performed.

8. The non-transitory computer-readable storage medium according to claim 1, wherein the touchscreen has a rectangular touch region having a first and a second side, the first side being longer than the second side.

9. The non-transitory computer-readable storage medium according to claim 1, wherein the reference coordinate point is moved to approach the coordinate point of the coordinate input according to a distance between the coordinate point of the coordinate input and the reference coordinate point.

10. The non-transitory computer-readable storage medium according to claim 1, wherein the first control moves a character object disposed in a virtual space of the game.

11. The non-transitory computer-readable storage medium according to claim 1, wherein the second control moves another object from a character object disposed in a virtual space of the game.

12. An information processing apparatus comprising a touchscreen having a touch region, and a computer, and for controlling a game using a coordinate input detected by the touchscreen, the computer being configured to execute at least:
- changing an upward/downward direction of an image displayed on the touchscreen between a first and a second display direction that is different from the first display direction by 90 degrees, depending on an orientation of the touchscreen with respect to the direction of gravity;
- changing an operation mode between a first mode in which the upward/downward direction of the image is the first display direction and a second mode in which the upward/downward direction of the image is the second display direction;
- setting a reference coordinate point based on a coordinate point of the detected coordinate input;
- performing a first control on the game;
- performing a second control different from the first control on the game; and
- setting a first and a second region in the touch region, wherein the first and second regions do not overlap each other, wherein
- in the first mode, a first reference coordinate point is set as the reference coordinate point based on the coordinate point of the detected coordinate input,
- in the second mode, a first region reference coordinate point is set as the reference coordinate point in the first region based on the coordinate input performed in the first region, and a second region reference coordinate point is set as the reference coordinate point in the second region based on the coordinate input performed in the second region, in the first mode, a direction of the first control to be performed on the game is determined based on a component in a first axial direction of a difference between the first reference coordinate point and a coordinate point of the coordinate input performed after the setting of the first reference coordinate point, in the first mode, a direction of the second control to be performed on the game is determined based on a component in a second axial direction of the difference between the first reference coordinate point and the coordinate point of the coordinate input performed after the setting of the first reference coordinate point, the second axial direction being different from the first axial direction, in the second mode, the direction of the first control is determined based on a component in a third axial direction of a difference between the first region reference coordinate point and a coordinate point of the coordinate input performed in the first region after the setting of the first region reference coordinate point, and in the second mode, the direction of the second control is determined based on a component in a fourth axial direction of a difference between the second region reference coordinate point and a coordinate point of the coordinate input performed in the second region after the setting of the second region reference coordinate point, the fourth axial direction being different from the third axial direction.

13. An information processing system comprising a touchscreen having a touch region, and a computer, and for controlling a game using a coordinate input detected by the touchscreen, the computer being configured to execute at least:

changing an upward/downward direction of an image displayed on the touchscreen between a first and a second display direction that is different from the first display direction by 90 degrees, depending on an orientation of the touchscreen with respect to the direction of gravity;

changing an operation mode between a first mode in which the upward/downward direction of the image is the first display direction and a second mode in which the upward/downward direction of the image is the second display direction;

setting a reference coordinate point based on a coordinate point of the detected coordinate input;

performing a first control on the game;

performing a second control different from the first control on the game; and setting a first and a second region in the touch region, wherein the first and second regions do not overlap each other, wherein in the first mode, a first reference coordinate point is set as the reference coordinate point based on the coordinate point of the detected coordinate input, in the second mode, a first region reference coordinate point is set as the reference coordinate point in the first region based on the coordinate input performed in the first region, and a second region reference coordinate point is set as the reference coordinate point in the second region based on the coordinate input performed in the second region, in the first mode, a direction of the first control to be performed on the game is determined based on a component in a first axial direction of a difference between the first reference coordinate point and a coordinate point of the coordinate input performed after the setting of the first reference coordinate point, in the first mode, a direction of the second control to be performed on the game is determined based on a component in a second axial direction of the difference between the first reference coordinate point and the coordinate point of the coordinate input performed after the setting of the first reference coordinate point, the second axial direction being different from the first axial direction, in the second mode, the direction of the first control is determined based on a component in a third axial direction of a difference between the first region reference coordinate point and a coordinate point of the coordinate input performed in the first region after the setting of the first region reference coordinate point, and in the second mode, the direction of the second control is determined based on a component in a fourth axial direction of a difference between the second region reference coordinate point and a coordinate point of the coordinate input performed in the second region after the setting of the second region reference coordinate point, the fourth axial direction being different from the third axial direction.

14. An information processing method for controlling a game using a coordinate input detected by a touchscreen having a touch region, the method comprising:

changing an upward/downward direction of an image displayed on the touchscreen between a first and a second display direction that is different from the first display direction by 90 degrees, depending on an orientation of the touchscreen with respect to the direction of gravity;

changing an operation mode between a first mode in which the upward/downward direction of the image is the first display direction and a second mode in which the upward/downward direction of the image is the second display direction;

setting a reference coordinate point based on a coordinate point of the detected coordinate input;

performing a first control on the game;

performing a second control different from the first control on the game; and setting a first and a second region in the touch region, wherein the first and second regions do not overlap each other, wherein in the first mode, a first reference coordinate point is set as the reference coordinate point based on the coordinate point of the detected coordinate input, in the second mode, a first region reference coordinate point is set as the reference coordinate point in the first region based on the coordinate input performed in the first region, and a second region reference coordinate point is set as the reference coordinate point in the second region based on the coordinate input performed in the second region, in the first mode, a direction of the first control to be performed on the game is determined based on a component in a first axial direction of a difference between the first reference coordinate point and a coordinate point of the coordinate input performed after the setting of the first reference coordinate point, in the first mode, a direction of the second control to be performed on the game is determined based on a component in a second axial direction of the difference between the first reference coordinate point and the coordinate point of the coordinate input performed after the setting of the first reference coordinate point, the second axial direction being different from the first axial direction, in the second mode, the direction of the first control is determined based on a component in a third axial direction of a difference between the first region reference coordinate point and a coordinate point of the coordinate input performed in the first region after the setting of the first region reference coordinate point, and in the second mode, the direction of the second control is determined based on a component in a fourth axial direction of a difference between the second region reference coordinate point and a coordinate point of the coordinate input performed in the second region after the setting of the second region reference coordinate point, the fourth axial direction being different from the third axial direction.

15. The method according to claim 14, wherein the direction of the second control is not determined by the component in the fourth axial direction of the difference between the first region reference coordinate point and the coordinate point of the coordinate input performed in the first region after the setting of the first region reference coordinate point.

16. The method according to claim 14, wherein the direction of the first control is not determined by the component in the third axial direction of the difference between the second region reference coordinate point and the coordinate point of the coordinate input performed in the second region after the setting of the second region reference coordinate point.

17. The method according to claim 14, wherein in the first mode, the direction of the first control to be performed on the game is determined based on a component in the first axial direction of a difference between the first reference coordinate point and the coordinate point of the coordinate input performed in the first region, continuously following the setting of the first reference coordinate point.

18. The method according to claim 14, wherein even when the first control based on the coordinate input performed in the first region after the setting of the first region reference coordinate point is being performed, the second control based on the coordinate input in the second region is performed.

19. The method according to claim 14, wherein the reference coordinate point is moved to approach the coordinate point of the coordinate input according to a distance between the coordinate point of the coordinate input and the reference coordinate point.

20. The method according to claim 14, wherein the first control moves a character object disposed in a virtual space of the game.

* * * * *